United States Patent
Wallace

(10) Patent No.: US 11,062,620 B1
(45) Date of Patent: Jul. 13, 2021

(54) SYSTEM AND METHOD FOR PROCESSING SIMPLE INGREDIENTS IN A RECIPE

(71) Applicant: Perfect Company, INC., Vancouver, WA (US)

(72) Inventor: Michael Wayne Wallace, Vancouver, WA (US)

(73) Assignee: Perfect Company, Vancouver, WA (US)

(*) Notice: Subject to any disclaimer, the term of this patent is extended or adjusted under 35 U.S.C. 154(b) by 434 days.

(21) Appl. No.: 15/795,807

(22) Filed: Oct. 27, 2017

(51) Int. Cl.
G09B 19/00 (2006.01)
G09B 5/02 (2006.01)
G01G 19/414 (2006.01)

(52) U.S. Cl.
CPC ..... *G09B 19/0092* (2013.01); *G01G 19/4146* (2013.01); *G09B 5/02* (2013.01)

(58) Field of Classification Search
CPC ...... G09B 19/0092; G09B 5/02; G09B 19/00; G09B 5/00; G01G 19/4146; G01G 19/41
See application file for complete search history.

(56) References Cited

U.S. PATENT DOCUMENTS

| | | | |
|---|---|---|---|
| 8,829,365 B1* | 9/2014 | Wallace | G06F 13/382 177/25.13 |
| 2011/0005842 A1* | 1/2011 | Chan | G01G 19/4146 177/25.14 |
| 2014/0318874 A1* | 10/2014 | Moses | G01G 19/414 177/1 |
| 2016/0219906 A1* | 8/2016 | Yu | G06F 21/64 |
| 2018/0165620 A1* | 6/2018 | Ross | G01G 19/414 |

* cited by examiner

*Primary Examiner* — Timothy A Musselman
(74) *Attorney, Agent, or Firm* — Rylander & Associates, PC; Philip R.M. Hunt

(57) ABSTRACT

A system and method directed to the dynamic processing of simple ingredients in recipes is described. Simple ingredients are defined and precision measurement of simple ingredients based on a smart scale is provided. The use of the measurement as feedback to count individual measurement units of simple ingredients and to associate a weight with the simple ingredients supports an improved level of accuracy in assessing macro and micro nutrient data for recipes and ingredients.

20 Claims, 19 Drawing Sheets

SYSTEM AND METHOD FOR PROCESSING SIMPLE INGREDIENTS IN A RECIPE

CROSS-REFERENCE TO RELATED APPLICATIONS

This application incorporates U.S. patent application Ser. No. 15/795,745, titled "A System and Method for Providing Feedback During the Preparation of a Recipe", to inventor Michael Wallace, concurrently filed, commonly assigned herewith, and hereby incorporated by reference in its entirety as if written in their entirety herein for all purposes. This application also incorporates U.S. patent application Ser. No. 15/625,573 titled "System and Method for Dynamic Display of Nutritional Data While Combining Recipe Ingredients," to inventor Michael Wallace, filed on Jun. 16, 2017, commonly assigned herewith, and hereby incorporated by reference in its entirety as if written in their entirety herein for all purposes. This application also incorporates U.S. patent application Ser. No. 15/625,643 titled "System and Method for Dynamic Adjustment of Recipe Ingredients," to inventor Michael Wallace, filed on Jun. 16, 2017, commonly assigned herewith, and hereby incorporated by reference in its entirety as if written in their entirety herein for all purposes.

BACKGROUND

Generally, recipes are based on predetermined portions of ingredients. Some ingredients of recipes can be counted as discrete measurement units, such as a number of the simple ingredient or a piece number. These ingredients can be referred to as simple ingredients.

Simple ingredients can include the following examples: a certain number of a particular fruit or vegetable, such as a banana, strawberry or grape. However, there can be variations in the actual weight of each individual unit of the simple ingredients. Examples of these are variations in different sizes, weights and/or volumes. Such variations can impact the weight and other nutritional information for the simple ingredient. For example, nutritional information can be determined by the size, weight and/or other characteristics of bananas, such as a small banana defined as between 6" to 6⅞" long versus a large banana that is 8" to 8⅞" long.

There is a need to improve the accuracy of measuring simple ingredients while combining the ingredients of a recipe. By improving the accuracy of measurement of simple ingredients, recipe ingredient proportions relative to each other also can be made more accurate. There is a further need to improve feedback about the addition of individual measurement units of simple ingredients, such as a number of the simple ingredient measurement units as they are added to a container for making a recipe.

Figure 1:
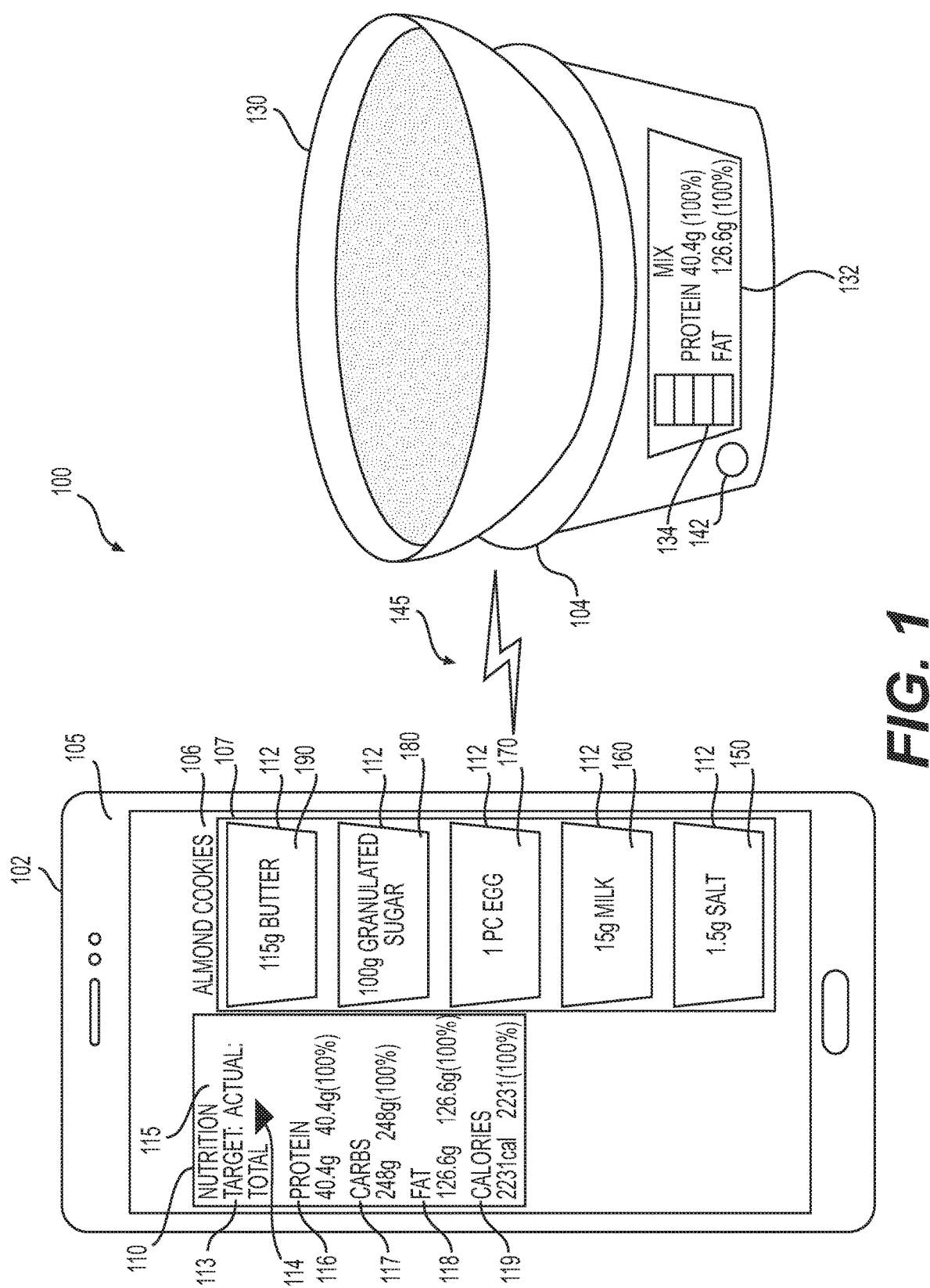
FIG. 1 is an illustrative example of a system that shows a client computing device and a smart scale.

While implementations are described herein by way of example, those skilled in the art will recognize that the implementations are not limited to the examples or drawings described. The drawings and detailed description thereto are not intended to limit implementations to the particular form disclosed but, on the contrary, the intention is to cover all modifications, equivalents and alternatives falling within the spirit and scope as defined by the appended claims.

When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

The headings used herein are for organizational purposes only and are not meant to be used to limit the scope of the description or the claims. As used throughout this application, the word "can" is used in a permissive sense (i.e., meaning having the potential to), rather than the mandatory sense (i.e., meaning must). Similarly, the words "include," "including," and "includes" mean including, but not limited to. In addition, use of directional terms such as "upper," "lower," "above," "underneath" or similar, are intended to describe the positions and/or orientations of various components of the invention relative to one another as shown in the various figures and are not intended to impose limitations on any position and/or orientation of any embodiment of the invention relative to any reference point external to the reference.

DETAILED DESCRIPTION

Examples of the present disclosure are directed to, among other things, methods and systems for improving the accuracy of measurement of certain types of ingredients in recipes. Recipes can include one or more ingredients that can be presented based on one or more measurement unit(s) for measuring the ingredient, instead of or in addition to other measurement approaches, such as weight, volume, density, or similar. These can be referred to as simple ingredients. A recipe can include a simple ingredient with an identification of a measurement unit for measuring the simple ingredient and a number of measurement units to provide a proportional relationship to other ingredients in the recipe. One indication can be the weight presented in the recipe.

In the present disclosure, simple ingredients also can be defined by the following examples: a specific number of a whole or a portion of a fruit, herb or vegetable, such as a banana, strawberry, grape, or similar. Simple ingredients also can be defined based on the following additional examples: a particular measurement unit based ingredient, such as a cracker, cookie, cinnamon stick, or similar. Simple ingredients also can be defined based on a unitized number, such as a specific number of scoops of a measuring container for protein powder, or a whole or a portion of a predetermined measurement tool, such as a cup, ½ cup, ⅓ cup, tablespoon, teaspoon, or similar. As is shown in the above examples, a measurement unit can be one of a whole or a portion of one of a simple ingredient or a container for measuring the simple ingredient. In addition, the container for measuring the simple ingredient can be one of a receptacle, a scoop, a cup, a measurement spoon or another measurement utensil, or similar. A number of measurement units also can be expressed as a numerical count, such as, for example, a first unit, a second unit, a third measurement unit; a first cookie, a second cookie; a first banana and ½ of a banana; or, 1 cup and ½ cups of flour, or similar.

Simple ingredients can have variations in sizes or size ranges, weight, volume, or other nutrient data, and can therefore have limitations on their use in recipes. Weight, volume or other measurement may or may not be presented with simple ingredients in a recipe. For example, a recipe can include a banana, where the specific size and weight of the banana can be different in different geographical locations and/or using different types or varieties of bananas. For another example, nutrient data can be compared for variations on cookie measurement units with the use of homemade cookies, which can be a variety of sizes and weights, to the use of Oreo™ cookies, which are consistently produced. As another example, a recipe that calls for one or more eggs can involve variability during each execution of the recipe, because eggs can be purchased in various sizes. At a granular level, individual eggs likely will not weigh precisely the same amount as one another. Therefore, it can be impractical in a recipe to recite a specific weight of an egg. As a result, in one example, the improvement in accuracy while using simple ingredients in a recipe can be achieved by providing feedback about the measurement unit and the number of measurement units for simple ingredients, as they are added to a scale in order to execute a recipe. The feedback can be based on each individual number of measurement units required for the simple ingredient (for example, for each banana or protein powder scoop where multiple bananas or scoops are called for) or for the total number of measurement units which equate to the total nutrient data for the simple ingredient (for example, for the total accumulation of the number of measurement units). In still further examples, the feedback can be provided for each of the number of measurement units along with an accumulating total as multiple measurement units are added, and the final total upon the completion of all of the measurement units. The identification of simple ingredients and the approach to processing the simple ingredients of the present disclosure based on the weight measurement provided by the scale is an improvement over past recipe execution approaches. The feedback can be provided based on data associated with the simple ingredient measurement unit and the completion of adding each measurement unit of the simple ingredient to the container in which the recipe is combined. The terms "combine," "combining," "execute," "executing," or "execution" or variations thereof, as used herein, include making a recipe or combining one or more ingredients as part of making a recipe.

The approaches to defining simple ingredients, a precision of measurement of simple ingredients based on the scale, and the use of the weight measurement feedback to associate a weight with the simple ingredients enable an improved level of accuracy in assessing macro and micro nutrient data for recipes and ingredients. Nutritional information can be part of the information content of a recipe. The nutritional information can include information on number of calories, as well as the weight or percent of a vitamin, mineral, fat, fatty acid, sugar, or similar, for a given amount of an ingredient or serving size of a recipe. A user can utilize nutritional information when searching for a recipe. The user can input a nutritional value such as a target or desired total amount of protein, calcium, fiber, or similar, as a recipe filtering criterion for selecting from among many recipes saved in, for example, a local or online database. The displayed nutritional information for a recipe can also include information relating to daily dietary recommendations such as those based on recommended daily allowance (RDA), as well as those that relate to food allergens and specific diets such as vegetarian, vegan, gluten-free, kosher, high-fat, low-fat, or high-carbohydrate diets.

As used herein, "nutritional data" can be defined to include or to be equated with the variety of terms and phrases for conveying nutritional data about recipes, including nutritional information, nutrition information, nutrient data, nutrient amount, nutrition data, serving size, number of servings, amount per serving, portions, serving portions, or similar. Nutritional data also can include one or more nutrient amounts, such as an individual nutrient amount of weight or a combination of weight and calories. Examples of nutrient amounts are: a measurement of the number of calories, as well as a weight, a volume, a density, a size, a length, or a weight of a protein, a fat, carbohydrates, calories, dietary fiber, vitamins, minerals, fatty acid, sugar, or another indication of nutrition. Nutritional data further can be determined for an ingredient, one or more ingredients, a recipe, a number of servings or a serving size of a recipe. In addition, nutritional data or amount can include information relating to additional daily dietary recommendations such as those based on a recommended daily allowance (RDA).

The present disclosure also is directed to, among other things, methods and systems for generating, by a smart scale, actual weight measurements of simple ingredients as they are added to a container in which the recipe is combined. By calculating an actual weight measurement as the simple ingredient is added, the scale can provide feedback about the addition of the simple ingredient. One form of feedback is whether an amount of the simple ingredient has been added which equates to one or more measurement units of the simple ingredient. In another example, the feedback can include whether the amount of the simple ingredient added is within a threshold amount of each measurement unit or a combination of one or more measurement units of the total amount of the simple ingredient. A threshold amount can take a variety of forms, including for example, within 1%, 2%, 5%, 10%, 25% or 50% of the target amount (such as weight, volume, density, or similar) of the simple ingredient called for in the recipe. Target and measurement unit weights can be the same where both are defined for the same entity, such an individual measurement unit or the total recipe 106. Where the actual weight measurement determined by the scale is within the threshold amount, then the simple ingredient equates to the target called for in the recipe. In another example, the feedback can apply differently when multiple measurement units of a simple ingredient are added; for the first measurement unit, a small threshold of variation may be used, whereas larger thresholds of variation may be applied for subsequent measurement units of the simple ingredient. This can apply where the actual weight measurement of initial measurement units is the same or very close to the target weight such that there is more flexibility for larger threshold variations for later measurement units.

The present disclosure also is directed to, among other things, methods and systems for generating, by a smart scale, an actual weight measurement of the measurement units or other representations of the simple ingredients. The measurement can then be used to determine how many specific measurement units have been added, and provide feedback when the count deviates from the expected number. For such cases, there can be a processing loop that can receive (net) weight information from the scale, determine how many of the measurement units are represented, and determine whether the appropriate count has been reached. In another example, an error recovery step can be added in the case where the measured weight by the scale does not correspond to the simple ingredient target weight.

The present disclosure also is directed to, among other things, methods and systems for generating, by a smart scale, an actual weight measurement of a simple ingredient as it is added to the container in which the recipe is combined. Data provided by the scale can then be compared to a target weight of the simple ingredient, which can be provided as part of the recipe. The actual weight measurement can be provided on an overall display with feedback about one or more measurement units, such as a collection of measurement units aggregated to represent the simple ingredient. The methods and systems also can include comparing the actual weight measurement of one or more measurement units to the target weight of one or more measurements units of the simple ingredient. The actual and target data can then be compared to determine whether one or more measurements units of the simple ingredient have been added to the recipe container. Either or both of the actual or target data can be displayed in association with the simple ingredient.

The present disclosure also is directed to, among other things, methods and systems for determining whether to apply a target weight as presented in a recipe versus an actual weight measurement of the simple ingredient determined by a scale where the target and actual amounts are different. Then, further, where the actual weight measurement or another amount that is different than the target weight is used, the systems and methods determine whether the recipe should be adjusted. For example, where an actual weight measurement of a simple ingredient is used, the methods and systems can determine whether to scale the other ingredients of the recipe in order to generate a proportional ratio of subsequent ingredients based on the change to the simple ingredient. In additional examples, the target weight can be used regardless of the actual weight measurement of a simple ingredient for further processing of a recipe.

In an alternative example, the systems and methods of the present disclosure process simple ingredients that may not easily allow for weight-based addition. Such discrete ingredients may be available in specific sizes or size ranges, and may not readily allow for granular addition of a specific weight. One example, as also described above, is a recipe that includes as an ingredient, one or more egg(s). Since eggs can be purchased in various sizes, and since no two eggs will weigh precisely the same amount, it is impractical to require that a specific weight of egg be added. Similarly, a recipe can call for a banana, where the specific size and weight of the banana is not presented as part of the recipe as it may not be critical, and therefore may not be specified. In this example, the scale can be used to provide the actual weight measurement for use in generating the actual nutritional information about the banana for the recipe as executed, or to indicate an achievement of an actual weight measurement within a range which is generally acceptable for the weight of the banana.

The systems and methods of the present disclosure are enabled by a scale that is calibrated to weigh ingredients using minute increments, such as a leaf of an herb or grains of salt. The precision offered by such scales also can afford an advantage over traditional scales. Higher precision measurement supports a more accurate and comprehensive assessment of each ingredient in the recipe as it is added to the container in which the recipe is combined. This precision improves the accuracy according to the predetermined portions set forth in the recipe.

In addition, the methods and systems of the present disclosure apply the higher precision scales in providing feedback about simple ingredients to the user. Utilizing precision weight detection of the actual weight measurement of a simple ingredient, based on individual measurement units, feedback can include monitoring the accurate addition of each measurement unit to avoid error. The feedback also can include a comparison between an actual simple ingredient amount received in the container during execution and the simple ingredient amount stipulated in the recipe. The comparison supports providing improved accuracy in the nutrient data for a simple ingredient and for a total recipe and provides options for the user (or on an automated basis) to adjust the recipe when converting a number of measurement units to an actual weight measurement by the scale. These characteristics of the methods and systems of the present disclosure improve the operation and processing of recipes using simple ingredients and generate additional data about a simple ingredient and a recipe based on the use of the actual weight measurement of simple ingredients detected by the scale. As a result, the processing of recipes, particularly including simple ingredients, has advantages for generating and increasing the accuracy of nutrient data in these recipes and enhancing the processing of a recipe based on higher precision proportions of ingredients. The precision of each individual ingredient, including simple ingredients, increases the precision of the proportion of recipe ingredients as they are measured and detected by the scale, and feedback is provided to the user.

This improved precision applies also to processing a recipe after a portion or all of the ingredients are added to a container and the portion or all of the ingredients are then combined. When a recipe is combined, the more precise recipe ingredient proportions support optimal operation for further processing, whether by hand or automated. For example, where a recipe (including a design for the ingredient proportions that takes into account optimizing how the ingredients are combined) is further processing in a machine, such as a blender or mixer, more precise ingredient proportions maximize the operation of the machine. The output of the feedback and selection based on actual weight measurement can be utilized to improve recipe ingredient proportions based on generating updated data. As a result, the methods and systems of the present disclosure provide improvements over traditional recipe processing.

The use of a threshold amount to compare an actual weight measurement of a simple ingredient from a scale to a target weight can also apply to a range of expected weights (volumes or other measurements for discrete ingredients and/or measurement units). More particularly, recipe ingredient data (such as metadata associated with the recipe) can further comprise an acceptable minimum and maximum weight of a simple ingredient. Recipe ingredient data can further comprise a weight estimate for a discrete simple ingredient for which multiple such discrete pieces (or other measurement units) for such ingredients can be required by a recipe. For example, if a recipe requires 10 graham crackers, an estimate of, or an upper and lower bound for, the weight of a single graham cracker can be specified by recipe ingredient data to permit counting of crackers being added in a recipe ingredient step. Another example of an analysis of the threshold amount is as follows: Since in practical terms, it is impractical or impossible for a user to add a precise amount of a given ingredient, a recipe ingredient can have a target weight with an associated dead band that defines a lower threshold weight less than the target weight, and an upper threshold weight greater than the target weight. The lower and upper thresholds can be determined as a percentage of the target weight, or as an absolute weight difference from the target weight. The dead band (and therefore the threshold amount) can be symmetric or asymmetric about the target weight. The dead band also can be adjustable by the user. Any measured weight within the dead band limits, that is, any weight that is greater than or equal to the lower threshold weight and less than or equal to the upper threshold weight, is considered as equivalent to or within the threshold amount of the target weight.

In another example, the use of a simple ingredient as an ingredient in a recipe can include one measurement unit of ingredient to be added, regardless of weight. The systems and methods, in this case, can respond to the actual weight measurement provided by the scale. The actual weight measurement can provide feedback to the user regarding the attributes of the weight. For example, if a recipe ingredient block provides for "a" or "one" banana, the system can weigh the banana when added, and determine the corresponding actual weight measurement. This methodology also can apply to multiple measurement units of a simple ingredient, such as "two," "three," or "four" bananas, or similar. The system can further display nutritional information as determined from an actual weight measurement provided by the scale. A recipe utilizing simple ingredient(s) can incorporate minimum and maximum limits as threshold amounts for the actual weight measurements. In this way, the systems and methods can provide limits on the simple ingredient that will satisfy one or more measurement units. The use of threshold amounts and actual weight measurements also can provide feedback to the user.

In still further examples, the systems and methods can provide feedback for how a user can manage target weights of multiple ingredients relative to each other. This can apply where there is variability regarding the size of individual measurement units, such as, for example, different size bananas. In this example, the actual weight measured for one measurement unit of the simple ingredient by the scale can be used as a basis to adjust the weight of other measurement units or even other ingredient(s). Where a recipe includes a discrete number of bananas, the systems and methods can compensate for the weight of the simple ingredient banana(s) by modifying the number of measurement units of the bananas as measurement units are added and the scale provides the actual weight measurement of each measurement unit. In one example, where the bananas are small, a target of three bananas are modified or adjusted upwards to 3 and ½ bananas or 3 and ½ measurement units of bananas based on their size. Adjustments also can be based on the contribution of other ingredients, such as blueberries. More specifically, if a recipe calls for one banana and blueberries, the recipe might specify a total weight for the combination, and adjust the target weight for the blueberries based on the actual weight measurement of the bananas provided by the scale. As a result, the systems and methods can accommodate adjustments based on nutrient data for one or combinations of ingredients, or similar. Another example is an adjustment to the amount of the ingredient based on adding less or more than the target weight of the simple ingredient as predetermined in the recipe. Multiple types of ingredient adjustments can be applied to individual ingredients or a combination of ingredients.

The methods and systems provide accuracy and adaptability based on feedback about simple ingredients as they are added to the recipe. The proportional relationship of recipe ingredients and/or nutritional data for individual ingredients or the total recipe can be supported based on the feedback about simple ingredients. There are many reasons to improve the measurements of individual ingredient(s), including simple ingredients, or total nutritional data as a recipe is combined. Some examples are dietary preferences; the nutritional content of one or more recipe simple ingredients; simple ingredient availability; medical diagnoses; geographical effects on the selection, use or cooking process relative to individual ingredients; other health bases; economic, dietary restrictions and/or preference or convenience factors; or similar. The systems and methods also can allow for an optimized way to calculate feedback about the simple ingredient(s), or other ingredients or the total recipe (i.e., scale the recipe) even when a user is already executing the recipe.

The systems and methods provide for various functionalities, operations, or actions involving a recipe with simple ingredients. For example, a user can select, retrieve, input, modify or receive a desired recipe and/or one or more ingredients or combinations of ingredients, the ingredients including individual simple ingredients or combinations of simple ingredients, related to the recipe to be shown as one or more indications on a display device. A user can enter a name for the recipe and/or one or more individual simple ingredients or combinations of simple ingredients to be edited or stored; enter a textual summary of the recipe, one or more individual simple ingredients or combinations of simple ingredients; add comments, alerts, warnings, images, graphic symbols, icons, or video on the recipe; select a storage location; schedule an automated display; and perform other actions relating to a recipe, one or more individual simple ingredients, or combinations of simple ingredients. A smart app user interface can be configured to allow a user to electronically navigate to a desired recipe, one or more individual ingredients or combinations of ingredients, including simple ingredients or combinations of simple ingredients; input the name of the desired recipe, one or more individual simple ingredients or combinations of simple ingredients; to select the desired recipe or simple ingredient from among a list of displayed items; to search by entering a textual description of the desired recipe or simple ingredient; to search for other recipes or simple ingredients containing similar total nutritional value or simple ingredients; and to perform other actions involving a selected recipe or one or more individual simple ingredients or combinations of simple ingredients.

A selected recipe or one or more simple ingredients can be presented to a user in various ways via user-selectable options provided on or by a smart app. As discussed further below regarding FIGS. 8A-8C and 9A-9D, simple ingredients can include discrete measurement units of either the simple ingredient itself (for example, two bananas or six grapes) or a measurement container for measuring the simple ingredients (for example, two scoops of protein powder). An additional example is: a visual depiction of one of the simple ingredient (such as a drawing of each individual measurement unit of the simple ingredient itself, as shown in FIGS. 8C, 9B and 9C) or a container for measuring the simple ingredient (as shown in FIG. 9D). The recipe or one or more simple ingredients can be displayed such that the desired amount of information is visible as one or more indications on a display field at the same time. A system display can also be configured such that a user can navigate from one recipe or one or more simple or other ingredients, to the next, or from one display page to another, using, for example, a gesture, control button, or key on a touch-sensitive display. In another example, a user can issue voice commands or queries to the system to allow the user to prepare a recipe based on a retrieved recipe without having to look at a display.

FIG. 1 is an illustrative example of a system 100 that shows a client computing device 102 and a smart scale 104. The client computing device 102 shows a user interface 105 for a smart app installed on the client computing device 102. The user interface 105 also shows the name of the recipe 106, i.e., "Almond Cookies," a nutritional panel 110 shown on the left-hand side of the user interface 105 and a recipe column 107 including a series of recipe ingredient blocks 112 comprising the list of ingredients, including individual simple ingredients.

Figure 6A:
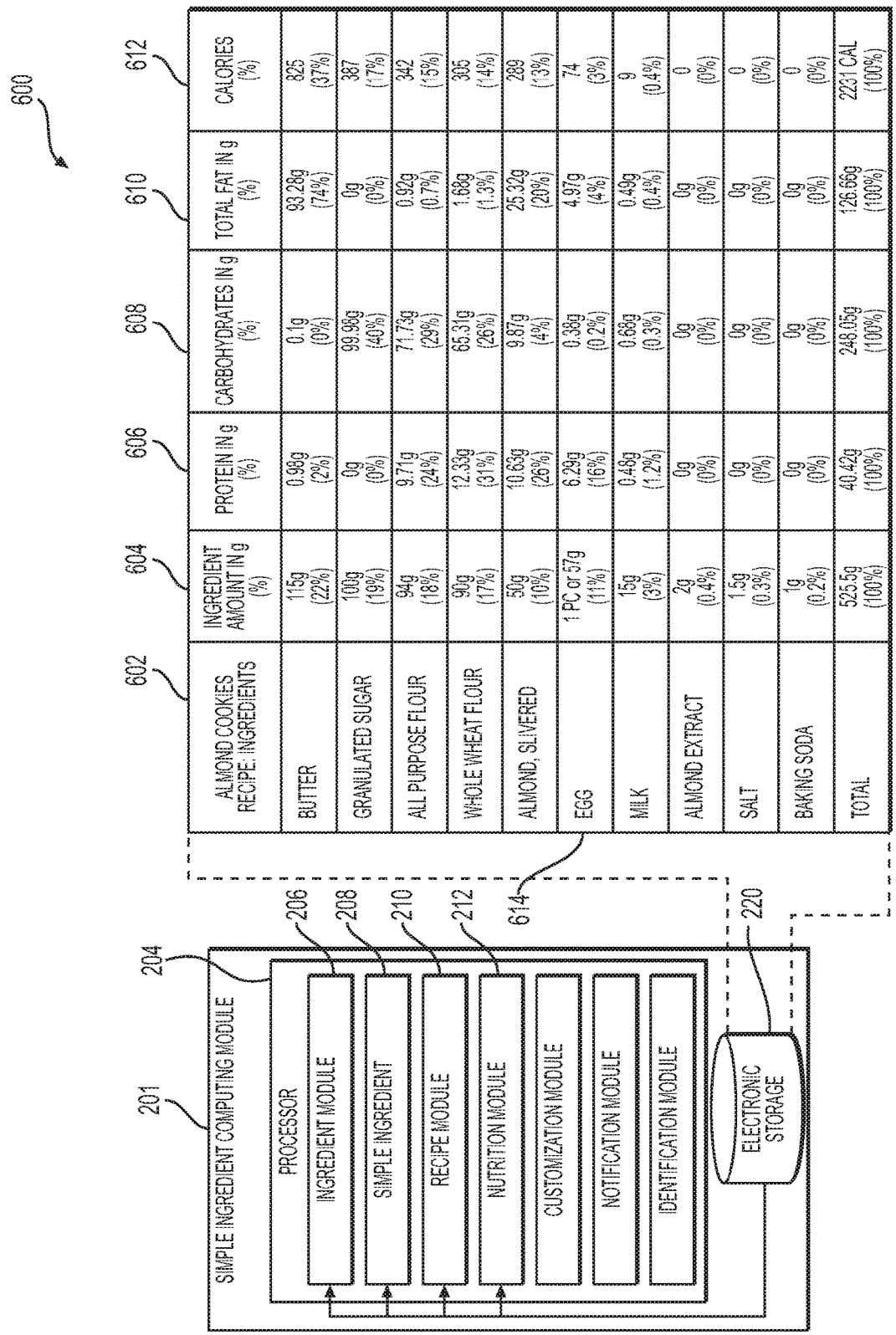
FIGS. 6A-6B are exemplary nutrition information tables.

The user interface 105 can include a recipe column 107, including recipe ingredient blocks 112 containing one or more of visual, textual, audio and/or video information about each ingredient, such as shapes, a listing of each ingredient and/or nutritional information. In addition, as described above and shown in more detail in FIGS. 8A-8C and 9A-9D, simple ingredients can be represented based upon the recipe ingredient block 112 and/or representations of one or more discrete measurement unit(s) which can be associated with simple ingredients. For example, in FIG. 1, the following ingredients are listed in the recipe ingredient blocks 112: salt ingredient 150, milk ingredient 160, egg ingredient 170, granulated sugar ingredient 180 and butter ingredient 190. The display can also provide a dynamic movement of its contents, such as scrolling through ingredients for the recipe 106, where providing ingredient information for a number of recipe ingredients lends itself to a movement function to optimize the data provided per ingredient. In this example, the ingredients 150, 160, 170, 180 and 190 shown are a portion of the recipe's complete ingredients (as shown in FIG. 6A). In addition, in this example, further information is provided in the recipe ingredient blocks 112, such as weight or the number of measurement units. Additional information may also be provided, as for example the percentage contribution of each ingredient to the recipe 106 total nutritional information for total calories.

Figure 3A:
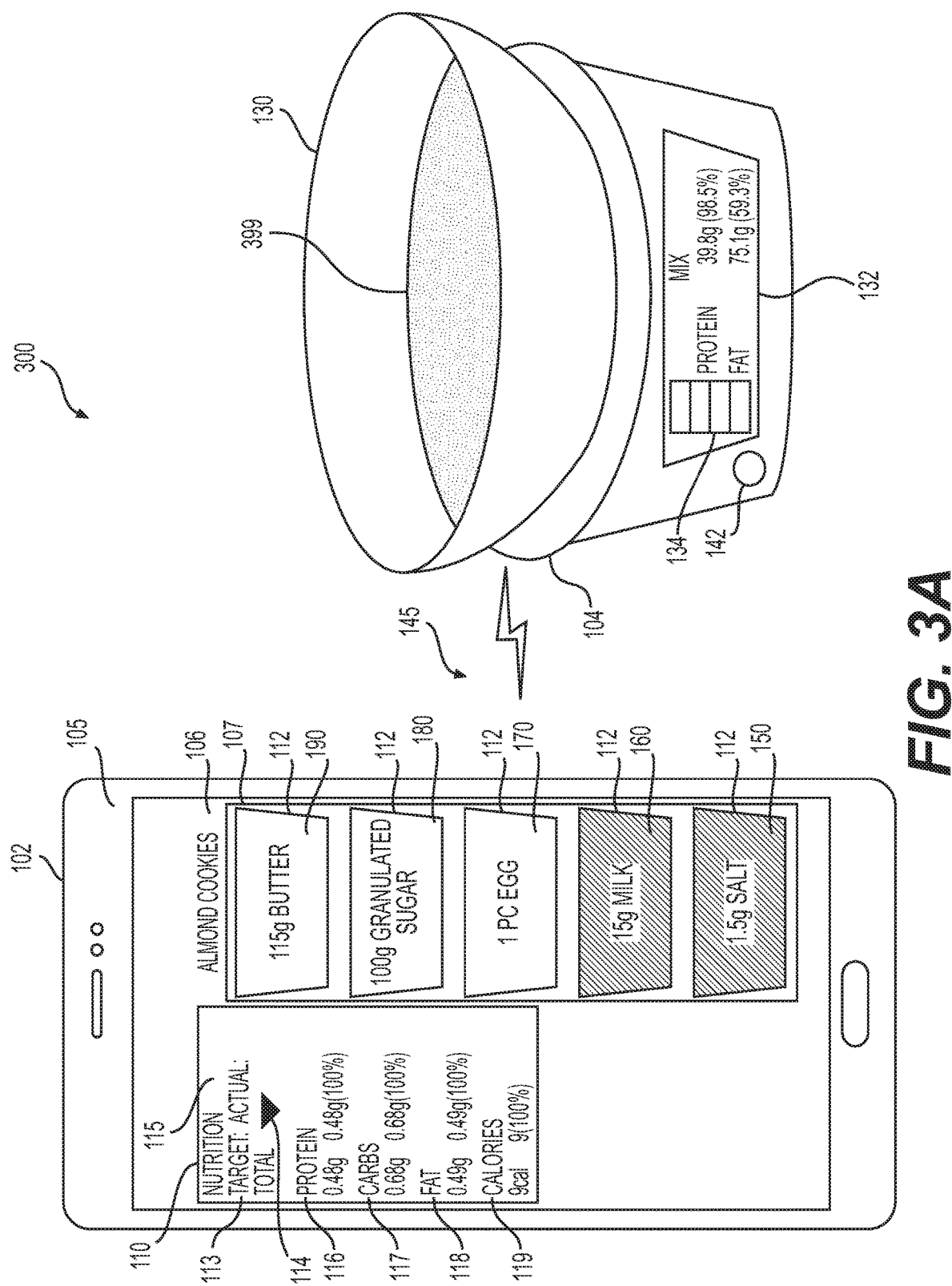
FIGS. 3A-3B are illustrative examples of the FIG. 1 recipe upon completion of adding specific ingredients in the recipe column.
Figure 3B:
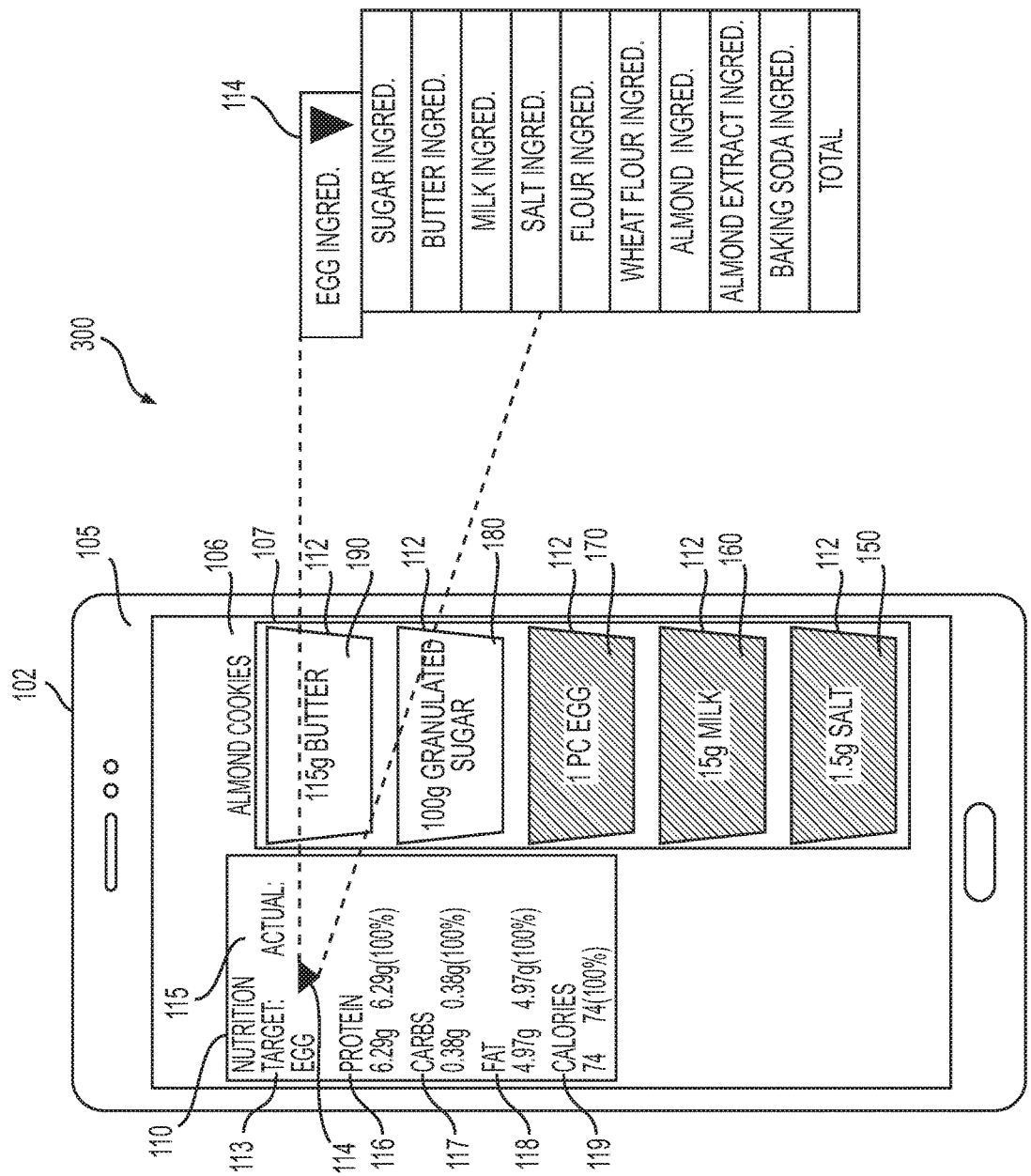

In addition, the recipe column 107 can include functionality to highlight the current ingredient being added, as well as changes to the display to visually present the addition of ingredients, as shown and described regarding FIGS. 3A-3B. This functionality is one of a variety of approaches supported by the system 100 to enable a user to receive feedback about the impact of each individual ingredient, including simple ingredients, during the process of adding ingredients to the container 130. Data is measured and provided to the system 100 on an approximately real time basis. The presentation of ingredient additions and resulting changes on an approximately real time basis of the nutritional information in the nutritional panel 110 supports the system 100 to process differences between the target nutritional data of the simple ingredient and the actual nutritional data of the simple ingredient. As used herein, "approximately real-time" is used to indicate processing as quickly as is practicable, and/or as can be achieved within the capability of human interaction or responses in the utilization of the methods and systems. The processing also is impacted by the latency inherent with communication protocols, hardware limitations, and software execution.

Various portions of the display can be rearranged or omitted based on the amount of nutritional information sought to be presented as one or more indications relative to the simple ingredients. Other bases are the impact of feedback about the simple ingredients based on the actual weight measurement of the simple ingredients from the scale, as well as the impact on the total nutrition of the recipe. In this example, selected ingredients from the "Almond Cookie" recipe 106 for illustration purposes are shown, including the simple ingredient "1 PC egg" (or one piece or measurement unit) for an egg 170 in recipe ingredient block 112, with the full ingredient list being provided and described further in FIGS. 6A and 7A. While the additional ingredients are not shown in FIG. 1, they can be presented as additional recipe ingredient blocks 112 which can be presented in the recipe column 107 in a scrolling manner, with successive ingredients being the next ingredient for the execution of recipe 106.

The system 100 includes the use of a container 130 into which recipe 106 ingredients, including simple ingredient egg 170, are added in order to execute the recipe 106. As each ingredient, whether a simple ingredient or other ingredient, is added, the scale 104 can measure the addition on an ongoing basis to provide feedback on the user interface 105 regarding the increasing weight being added to the container 130. In addition to feedback regarding the increasing weight, other feedback can include other representations of one or more measurement unit(s) of the simple ingredient (such as are shown in FIGS. 9B and 9C as multiple visual depictions of simple ingredients) with a contrast between measurement units that have been added to the container 130 and measurement units yet to be added. As discussed above, the system 100 dynamic feedback about simple ingredients provides advancements in the innovative use of precision scales, such as smart scale 104, to provide feedback in order to improve the use of simple ingredients in making recipes. In one example, when a simple ingredient is added to the container 130, the user interface 105 can display the new nutritional information regarding the simple ingredient (and/or the total recipe nutritional data) on the nutritional panel 110 as well as the nutritional information for the entire recipe. The new information can include updated data for the actual nutrition of the ingredient versus the target nutrition of the ingredient.

The nutritional panel 110 can include two nutrition information columns. The left-hand column, with the header "Target" 113, can include data for the target nutritional information of either one of the individual ingredients, including simple ingredients, or the total nutritional information for the complete recipe 106, depending on the selection using the data entry field 114. The data entry field 114 supports a drop-down box, scroll function or other data selection entry (as discussed further below regarding FIG. 3B) for either the complete recipe 106 or one of the ingredients listed in a recipe column 107 for the ingredients of the recipe 106. The data entry field 114 currently shows "Total" (additional options not shown in FIG. 1 are shown and described further below regarding FIG. 3B). The right-hand column, with the header "Actual" 115, can include data associated with the actual amounts of nutrients based on a weight measurement of each ingredient detected by the scale 104 (expressed in terms of weight in grams or in calories). The nutrient data also can include a corresponding percentage measured relative to the target nutrition amount 113. The nutrition information for each of the target nutrition 113 and the actual nutrition 115 can include nutritional information for categories such as protein 116, carbohydrates 117 (shown as "Carbs"), fat 118, and the number of calories 119, as well as other categories of nutritional information. In the recipe column 107, each of the ingredients specified in the recipe 106 can be shown in the recipe ingredient blocks 112. The blocks 112 also can include an indication of the predetermined amounts or weights specified in the original recipe 106. Upon executing the recipe 106 such that the ingredients are measured on the scale 104, the blocks 112 can also be visually altered to show the weight data from the scale 104 as it measures each ingredient. In addition, for simple ingredients, such as the egg 170, one or more measurement unit(s) or pieces can be shown as being added in the recipe ingredient block 112, with individual measurement units or in a different display format (as shown in FIGS. 9C and 9B, respectively).

Initially, the blocks 112 can display the same nutritional data as the target nutrition 113, and the percentages for each nutritional category consequently are 100%. In addition, the nutritional panel 110 can display data based on the total recipe 106 or individual ingredients selected using the data entry field 114. In further examples, the panel 110 can display data while the scale 104 is operating to take actual weight measurements of individual ingredients as the recipe is made. As an ingredient is being added, the data entry field 114 can change to show the actual ingredient, and the nutrition panel 110 can display data relevant to that ingredient in an approximately real-time manner. In other examples, the system 100 can support customization of the data displayed in the recipe ingredient blocks 112 and the nutritional panel 110.

The smart scale 104 can include a display interface 132 that shows the amount of ingredients as they are added to the container 130 and an action to be executed for the current ingredient being added or to be added next (in this example, the action is "Mix"). The display interface 132 also can show nutritional information, including content and recipe 106 ingredient information, including a portion or all of the categories and data shown in the nutritional panel 110, or as customized by the user. In this example, a portion of the data from the nutritional panel 110 is shown, including nutritional categories protein and fat (the data is the same as the amounts shown where "Total" has been selected in the selection 114 as in this example, the recipe 106 is completed and the final ingredient has been added to the container). The display 132 can provide ingredient and nutritional information on a per ingredient basis in other examples, and the user can customize the display by accessing, for example, the customization module 212 shown in FIG. 2. The display 132 also can include a progress bar 134 that indicates the current amount of ingredient already added into the smart scale 104. The smart scale 104 can also provide other programmable or predefined hardware buttons for enabling various options, including a Bluetooth button 142, or similar.

The system 100 can include options for the user to select from predetermined features of display 105, or to customize features, so that a variety of nutritional information can be highlighted in the recipe ingredient blocks 112, and the display 105 can include data selection options to change the display 105 to present different information during execution of the recipe 106.

The smart scale 104 and the client computing device 102 can have one or more processors configured to execute various functions, operations, commands, functionalities, processes, and computer modules. In other examples, the system 100 can utilize other devices or locations for executing various functions, including for example, receiving data from the smart scale 104 and processing the data to provide feedback about simple ingredients, to calculate the resulting impact on the total nutrition of recipes, and to calculate and display a comparison between the nutrition of the target ingredient (as specified in the recipe 106) and the nutrition of the actual ingredient measured by the smart scale 104. Such other devices can include processors remotely accessible by the smart scale 104, such as additional device(s) that can communicate with the scale, or a user interface 105 integrated into the scale 104 or as part of another device independent of the scale 104. The scale 104 also can include a portion or all the processing capabilities, or the processing can occur on the basis of a distributed network with portions of or full processing implemented in one or more server(s), which are distributed within a network between remote devices. One example of a communications channel is shown in FIG. 1 as a network 145.

The smart scale 104 further can also include notification or feedback systems in the form of optical and audio signals or alerts that can be used to assist the user when performing an operation such as when scanning ingredients to identify the ingredient(s) or pouring/adding an ingredient into a container (for example, container 130) on the smart scale 104. Audio or visual prompts for the user can be activated from the client computing device 102 or the smart scale 104. For example, the system 100 can talk a user through the recipe 106. It can also provide incremental audio notices as a user adds ingredients. For example, if a recipe calls for six eggs the system 100 can audibly count as the user adds the eggs. The system 100 can count each of one or more discrete measurement units or a container for measuring the simple ingredient, such as, for example, a measurement implement including a tablespoon, cup, scoop, or similar. The system 100 can also ask the user if the user wants to make adjustments to ingredients, including simple ingredients, on the fly based on feedback. The system also can adjust one or more other ingredients, such as increasing blueberries to correspond to the reduction in the nutritional data due to the reduced size of the banana. For example, the system may ask "would you like to add more blueberries because the banana received is smaller than a standard size banana?" and then adjust the ingredient on the fly. The adjustments can be done based on audio answers in this example, without any further input from the user. Timers (not shown) can also be set for actions requiring timing. These timers can be displayed on the client computing device 102 or the smart scale 104. An optional microphone on the smart scale 104 or the client computing device 102 can be used for voice prompts/commands. The smart scale 104 can also be configured to use one or more types of connectors such as an audio jack, Bluetooth, USB, or similar, and standard or custom communication protocols.

The client computing device 102 can be configured to allow a user to access and interact with any components of the system via a smart app 202 (shown in FIG. 2) installed on a client computing device 102. The client computing device 102 can include the user interface 105, one or more processors, electronic storage, and other components. A client computing device 102 can include one or more of the following: a desktop computer, laptop computer, handheld computer, tablet computing platform, netbook, smartphone, and other computing platforms. The client computing device 102 can send commands to or receive requests or prompts from the smart scale 104.

The user interface 105 on the client computing device 102 and the smart scale display 132 can show various types of information in approximately real-time, such as, the current amount of a simple ingredient being added, which ingredients have already been added including their individual measurement units, nutritional values of one or more nutrients for the current amount of the simple ingredient being added or already added, simple ingredients and their corresponding measurement units still to be added, and other actions already completed and still to be performed.

In one example, the system 100 includes at least one display integrated with the smart scale 104 and at least one other display that forms part of a client computing device 102. Both can be used for providing one or more indications of various types of information that facilitate the preparation of a recipe selected for or by the user. The smart scale display 132 can also show approximately real-time information that includes the connection status of the smart scale 104 with the client computing device 102.

The user interface 105 can also be configured to provide interface functionality to the user and at least one client computing device 102 through which the user can provide information to and receive information from the system. This enables data, user comments, feedbacks, alerts, results, queries, instructions, or similar, herein collectively referred to as "information," to be exchanged between the user and the system 100. Examples of user interface 105 hardware and/or software components include a touch screen, keypad, touch sensitive and physical buttons, switches, keyboard, knobs, levers, display, speakers, microphone, indicator light, audible alarm, printer, and other interface devices. In some system implementations, the user interface 105 includes a plurality of separate interfaces. The user interface 105 can include at least one interface integrated with the client computing device 102. In further examples, a user interface 105 can refer to software, hardware, a combination of hardware and software, or a device the primary function of which is to allow communications or interactions between two or more devices or between a user or plurality of users and one or more devices. A user interface 105 can be configured such that a user can navigate through electronic folders, databases, servers, networks, and various local or external storage media to locate, view, select, or store the desired recipe. In addition, data provided to the user via one or more formats (such as, one or more indications on a user interface, including a first indication, a second indication, a third indication, a fourth indication, a fifth indication et al.) may be presented as one or more of text, alphanumeric characters, graphics, scale, charts, visual indications, audio indications, video indications or other depictions.

Figure 2:
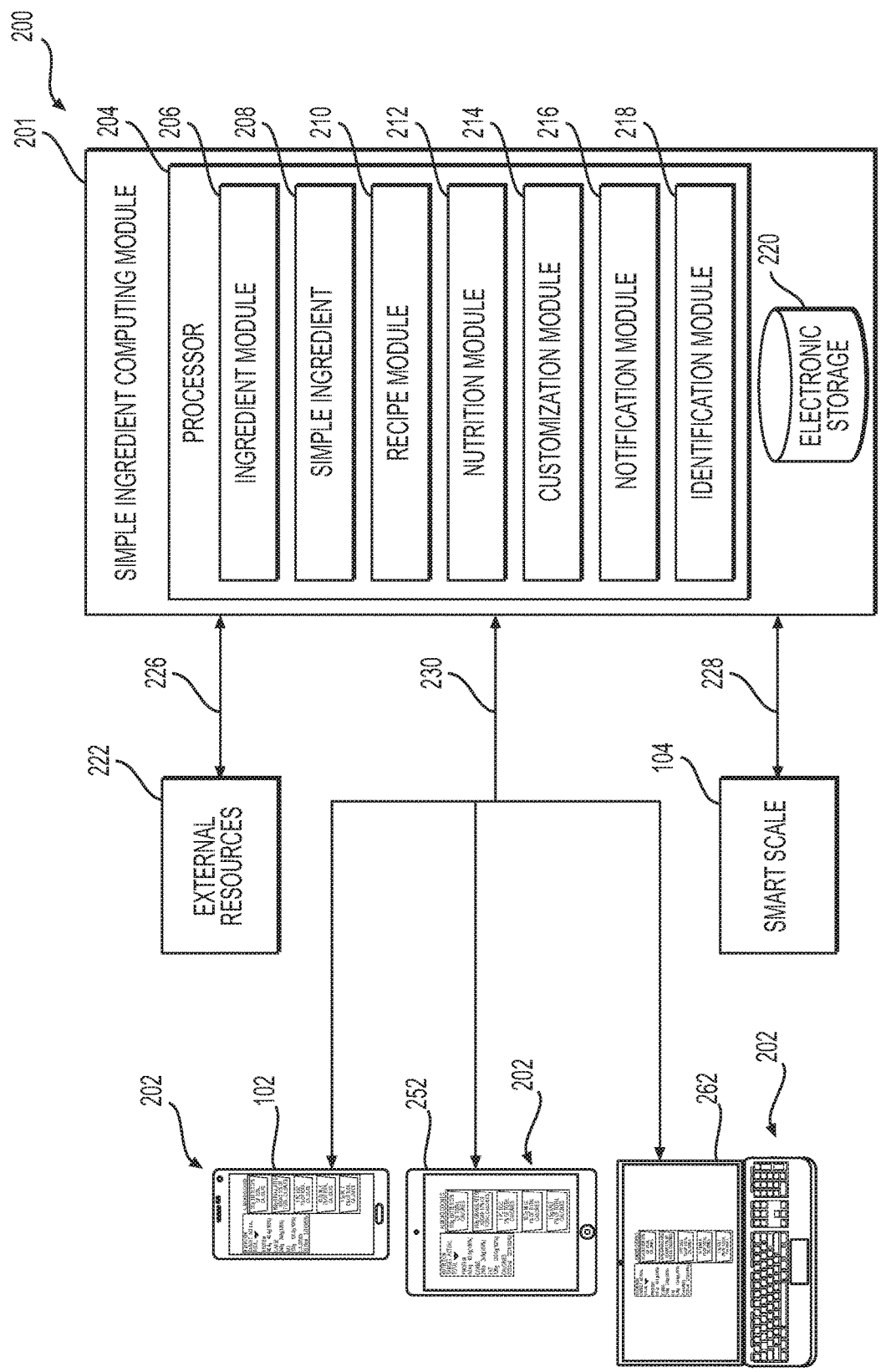
FIG. 2 is a schematic diagram of an illustrative computing environment showing components that communicate to enable various operations.

The system 200 shown in FIG. 2 to support the computing environment of FIG. 1 is now described. FIG. 2 is a schematic diagram of an illustrative computing environment 200 showing components that communicate to enable various operations involving a smart scale, such as the scale 104, a computing module 201, and one or more client computing devices, such as the client computing device 102 also shown in FIG. 1. The computing module 201, titled "Simple Ingredient Computing Module," can be implemented in a smart app 202, installed on one or more client computing devices 102 (a mobile phone), 252 (a tablet) and 262 (a laptop), or similar. The simple ingredient computing module 201 can include at least a processor 204, the ingredient module 206 for processing directed to one or more ingredients of the recipe 106, the simple ingredient module 208 for processing directed to one or more simple ingredients of the recipe 106, the recipe module 210 for processing directed to the recipe 106, and the nutrition module 212 for processing directed to the nutritional panel 110. The computing module can further include the customization module 214 for processing custom changes to the system 100, such as implementing or changing the designs of displays and/or one or indications for user interfaces. The customization module 214 can provide an automated preselected simple ingredient processing filter. The preselected simple ingredient processing filter can be applied to the recipe to automatically assign to a simple ingredient an actual weight measurement of the simple ingredient as it is processed and calculated by the scale 104, thereby replacing the target weight of the simple ingredient in the recipe 106. In additional examples, the simple ingredient processing filter can be applied to the recipe to automatically assign to a simple ingredient a target weight of the simple ingredient presented in the recipe 106 regardless of the actual weight measurement as it is processed and calculated by the scale 104. The filter also can be customized using the customization module 214. The simple ingredient computing module 201 can further include the notification module 216 for processing notifications to the user of the system 100 during operation of the system 100; the identification module 218 for processing identifying new data for the system 100 such as new recipes, new substitute ingredients or similar; and an electronic storage 220. The client computing device 102 can engage in two-way or one-way communications with the smart scale 104 (using communication connection 228), one or more external resources (using communication connection 226), and the smart app 202 in one or more devices 102, 252, and 262 (using communication connections 230). The communication connections 226, 228 and 230 can be wired or wireless and may be one-way or two-way. In another example, a smart scale 104 using a two-way link (not shown) with devices 102 provides even more functionality. The simple ingredient computing module 201 can include one or more algorithms, software, a component of a software, or a database that performs, or is involved in the performance of, one or more operations including calculating values, retrieving data, storing data, editing a file, deleting files, transmitting data or instructions, receiving data or instructions, displaying various types of information or data, processing data, and allowing communication between two or more devices, servers, or networks.

The smart app 202 can be configured to transmit or receive approximately real-time information to or from the smart scale 104. The smart app 202 can be installed on at least one of a variety of client computing devices 102. Examples of such devices are shown in FIG. 2 and include devices 102, 252 or 262, or similar. In yet further examples, the smart app 202 can be installed on the scale 104 or on a separate hardware and/or software platform. In another example, portions of the smart app 202 processing can occur in multiple components. The smart app 202 can access information relating to recipes, ingredients (including simple ingredients), target nutrition, and corresponding nutritional data for a given amounts of ingredients and simple ingredients in a recipe. The smart app 202 can further access information relating to feedback based on the actual weight measurement of simple ingredients from the scale 104, actions, notifications, and schedules. The smart app 202 can access information from local, external and/or online databases, including metadata for recipes. The smart app 202 can also present a user with user interface 105 that provides menus and menu options. The user interface 105 can also provide means for entering, searching, storing, and identifying user inputs, information, and data. Such user inputs, information and data can include actions to be performed; amounts of simple ingredients to be added; the calculation of the actual weight measurement by the scale 104 and comparison to the target weight simple ingredient; adjustments to one or more ingredients and/or recipes, including based on a difference between the target weight of the simple ingredient the actual weight measurement of the simple ingredient; corresponding nutrition data for a given simple ingredient quantity, a combination of simple ingredients and/or the total nutrition for the complete recipe; recipes with similar total nutritional values; links; and similar data. The smart app 202 can be configured to receive commands or instructions via various methods for user inputs such as using a touchscreen display, keypad, keyboard, voice commands, visual commands, and similar. For example, the smart scale 104 can have a button pad that allows transmission of instructions or commands to the smart app 202, or vice versa.

The smart app 202 can be further configured to assist the user in receiving feedback about the amount of simple ingredients based on data detected at the scale 104. When an actual weight measurement detected by the scale 104 for an individual simple ingredient of a recipe is different than the target weight of the simple ingredient as included in the recipe 106, then the smart app 202 can automatically display the actual nutritional information associated with the amount detected for the simple ingredient. The smart app 202 also can calculate the impact on the difference between the target and actual nutrition on the simple ingredient's nutritional information and on the nutritional information for the complete or total recipe 106. Where the scale 104 detects a difference between the target and actual ingredient amounts, the notification may assist the system 100 to process and determine whether the actual weight measurement of the simple ingredient should be associated with the simple ingredient or whether the target weight of the simple ingredient should be maintained. In one example (not shown), after a notification such as, "the scale has detected that the amount added of the simple ingredient is different than the target weight in the recipe," a user can be prompted to select either the actual weight measurement detected by the scale or the target weight. The smart app 202 can present a query such as "do you want to proceed with an adjustment to the nutritional information for the current simple ingredient based on the amount detected by the scale?" The user can select either the actual or target, or yes or no options. The target and actual nutrient data also can be reflected in the target nutrition 113 and the actual nutrition 115 on the nutritional panel 110. If the user agrees with the actual nutrition as a basis to adjust the current simple ingredient, the system 100 can update the real time storage of the nutritional information to reflect that the actual nutrition is being used to provide the calculations for further processing of the recipe 104. If the user does not want the current amount as a basis to adjust the current simple ingredient, the system 100 can maintain the target nutritional data associated with the simple ingredient for the continuation of processing the recipe 106. In other examples, the system 100 can assign either the target or actual nutrient data based on a predetermined approach associated with the recipe 106, a customization as supported by the customization module 214 or a number of other approaches to preset, or offer as options to the user, the processing of the simple ingredient when the target and actual nutrient data different.

In one system 100 implementation, the simple ingredient to nutrition computing module and external resources 222 can be configured such that receiving entry or selection of an ingredient can include reading, scanning, and optically recognizing information that identifies an individual simple ingredient. For example, external resources (not shown individually) and a client computing device 102 can include a scanner controlled via a user interface 105 configured to recognize a standard barcode, QR code, RFID tag, or other identifying information included on the packaging of a simple ingredient or the simple ingredient itself. An external resource, the client computing device 102, or the smart scale 104, can include optical recognition sensors controlled via the user interface 105 that is configured to optically recognize individual ingredients. Scanning simple ingredient identification data or the simple ingredient itself can provide a convenient way for the system to determine which recipe ingredient is next to be added to the container 130 on the smart scale 104.

The system allows a convenient way to identify an ingredient to be added into a smart scale container 130, as well as a quick and easy way for a user to pre-weigh an ingredient. For example, a recipe may call for the addition of two pieces of banana, one piece of apple, and two large eggs for a high-protein, high-carbohydrate fruit shake. In this case, the user can quickly notify the system as to the next ingredient to be added by the user into the smart scale container 130. This can be done by simply putting the ingredient in front of an image sensor on the smart scale 104 or a client computing device 102 so the system can scan the ingredient image and identified it via image recognition software. In another example, a user can have the image of the ingredient scanned using a camera, which can be on the smart scale 104 or a user's portable device. After acquiring an image of an ingredient (for example, a banana), the system can identify the ingredient, for example by comparison with previously stored images of that ingredient. After the system identifies the ingredient, the weight of the ingredient can be estimated using a known typical weight of an ingredient of a given size as a reference and comparing it with the ingredient's approximate size derived from its scanned image. After estimating the weight of a scanned ingredient, the system can display the approximate weight of the ingredient, as an alternative scanned weight approximation. This approximation can assist in estimating the actual weight measurement from the scale 104 and/or for comparison to the target weight of the simple ingredient, in a similar manner to the use of the actual weight measurement from the scale 104. Alternatively, the system can generate a message on the display 105 (either on the smart scale or portable device), or via a voice message generated by the system, informing the user that the weight of the banana is or has the potential to be greater or less than the weight of banana required by the recipe.

FIGS. 3A-3B are illustrative examples of the FIG. 1 recipe 106 upon completion of adding specific ingredients in the recipe column 107. In the FIG. 1 example, the final ingredient is shown as the top recipe ingredient block 112 based on a portion of the recipe 106 ingredients, 150, 160, 170, 180 and 190, being displayed with the butter ingredient 105 being the final recipe ingredient block 112. This FIG. 3A example shows that the additions of two ingredients are completed based on highlighting the recipe ingredient block 112 for the relevant ingredients, such as shown here for each of salt 150 and milk 160. There can be numerous highlighting indications in the recipe ingredient block 112 of the completion of adding ingredients. These can include textual, visual, audio, video or other notification of operations being performed regarding that recipe ingredient block 112.

FIG. 3A is a schematic diagram of an illustrative computing environment usable to provide a user interface 105 display option for the nutritional panel 110. The nutritional panel 110 can include the data entry field 114 icon for input to select either an ingredient or a total (for the total value for the recipe 106). More particularly, the nutrient data presented in the nutritional panel 110 can be either for the total recipe 106 (as shown in FIG. 3A) or for any one of the individual ingredients in the recipe 106 (as shown in FIG. 3B, the egg 170 ingredient). In these FIGS. 3A and 3B examples, the data entry field 114 icon can be activated in order to expand the listing to multiple listing selections. This is shown in FIG. 3B, with the data entry field 114 expanded for this recipe 106 to display the following ingredients: egg, butter, sugar, milk, salt, flour, wheat flour, almond, almond extract, baking soda or the "total" to designate the nutrition for the complete recipe 106. In FIG. 3B, the egg 170 ingredient is selected. Upon selection in the data entry field 114 of an item, the nutritional panel 110 can be updated to reflect the target nutrition 113 and the actual nutrition 115 for that selected item.

In FIG. 3A, the data entry field 114 presents total as an indication that the nutrient data presented in the nutritional panel 110 is for the total recipe 106. The target nutrition 113 presents the target nutrient data as indicated by recipe 106 expressed in terms of weight in grams or in calories. The actual nutrition 115 presents the actual nutrient data based on the actual weight measurement of each ingredient, including simple ingredients, as they are detected and processed by the scale 104. The actual nutrition 115 can include data associated with the actual nutrition based on an actual weight measurement of each ingredient, expressed in terms of weight in grams or in calories, and the corresponding percentage measured relative to the target nutrition 113. The nutritional panel 110 therefore is updated to provide the nutritional data related to the total ingredients of salt 150 and milk 160 ingredients, which have been added to the recipe 106. This is shown in the nutritional panel 110 with the following data for protein 116 of 0.48 g, carbs 117 of 0.68 g, fat 118 of 0.49 g and the number of calories 119 of 9.

Figure 7A:
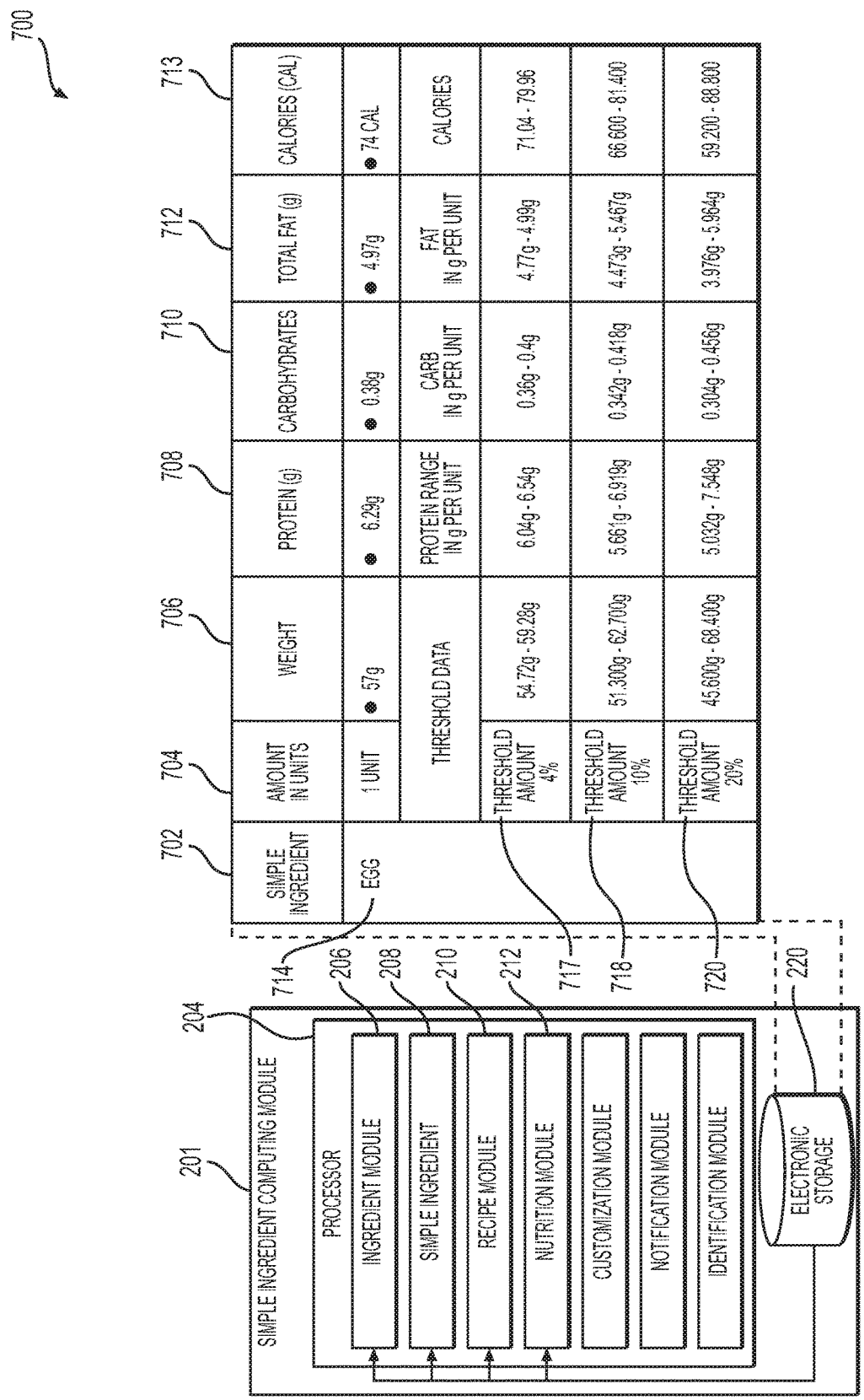
FIGS. 7A-7C are simple ingredient nutritional information tables for the purpose of presenting examples for generating and processing threshold amounts relative to the target or measurement unit weights of simple ingredients.

In FIG. 3B, the data entry field 114 currently shows egg as an indication that the nutrient data presented in the nutritional panel 110 is for egg 170 ingredient. Therefore, the nutritional panel 110 is updated to provide the nutritional data for the target nutrition 113 related to egg 170 ingredient. In addition, in FIG. 3B, the egg 170 ingredient is a simple ingredient, with a description on the display 107 of "1 PC egg." This is equivalent to a single egg or a single measurement unit for an egg. In this example, the target nutrition 113 can present the amounts of nutrients as indicated by recipe 106 for one piece or measurement unit of egg, with the smart app 202 provided with the nutrient data associated with this egg 170 ingredient from any number of sources, including the recipe 106 listing, metadata associated with the recipe and/or a third party resource. In other examples, the nutrient data associated with the one piece or measurement unit of the egg 170 ingredient can be an average of a range of amounts so that variations in the sizes and other characteristics of ingredients can be incorporated into the data. Such variations can include size, weight, volume, density, and macro and micro nutrient variations as a function of the ingredient itself. One example of a table including data about the egg 170 ingredient is shown in FIG. 7A as described below. In addition, variations can further include the following characteristics regarding the production and handling of the simple ingredient prior to use in the recipe 106: the geographic location of the simple ingredient, the variety of the simple ingredient, the time of year during which the simple ingredient is harvested and/or used, the time from harvesting the simple ingredient until use in the recipe, or change in weight based on factors related to one of the acquisition, transportation, or use of the simple ingredient, or similar. While the target nutrition 113 can present the nutrient amounts relative to the measurement unit of the simple ingredient, the actual nutrition 115 can present the amounts based on the weight measurement as the ingredients are detected and processed by the scale 104. Accordingly, in this FIG. 3B example, the actual nutrition 115 can include data associated with the actual weight measurement of each ingredient detected by the scale 104, expressed in terms of weight in grams or in the number of calories, and the corresponding percentage measured relative to the target nutrition 113. FIG. 3B shows that a simple ingredient of an egg 170, also is completed based on highlighting the recipe ingredient block 112 for the relevant ingredient, as shown here for each of salt 150, milk 160 and egg 170 ingredients. In this example, the egg 170 ingredient is currently being processed by the smart app 202 and the nutritional panel 110 is updated to provide the nutritional data related to that ingredient. This is shown in the nutritional panel 110 with the following changes to produce the following data: protein 116 of 6.29 g, carbs 117 of 0.38 g, fat 118 of 4.97 g and the number of calories 119 of 74. In additional examples, the nutritional panel 110 can prompt a listing that corresponds to the ingredient currently identified as the active ingredient for an adding operation in executing the recipe 106. Therefore, the data entry field 114 can be automatically advanced to the next ingredient and/or employed as a selection option for user input.

Figure 4:
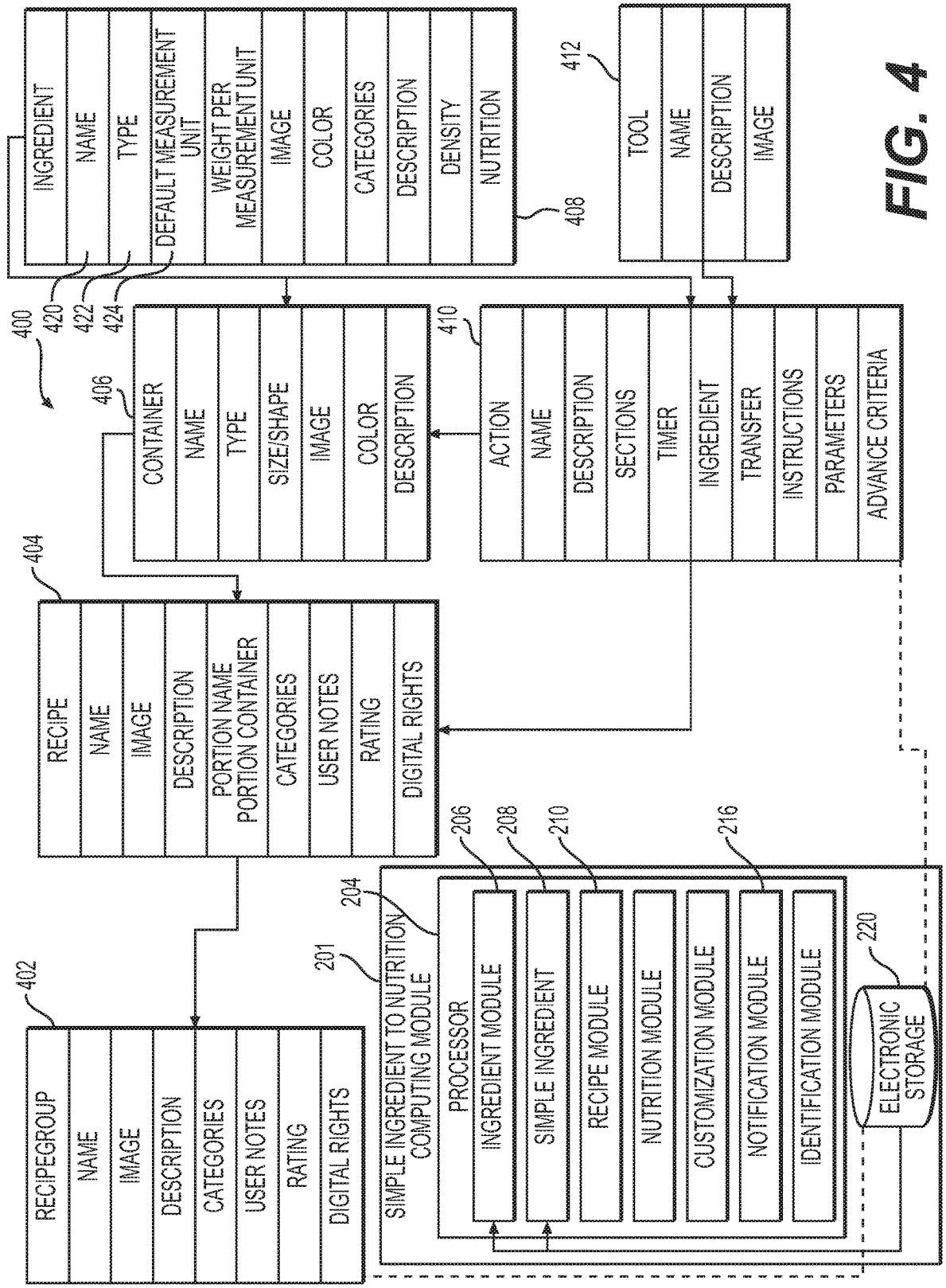
FIG. 4 is an illustrative data structure showing the data flow among various data sets associated with the execution of a recipe.

FIG. 4 is an illustrative data structure 400 showing the data flow among various data sets associated with the execution of a recipe 404, including various data sets as follows: the recipe 404 and container data 406, ingredient data 408 and action data 410, which encompass the comprehensive execution of a recipe 106. The data structure for ingredient data 408 can include, in addition to the ingredient name 420, additional data relevant to simple ingredients: the ingredient type 422 can be a simple ingredient and, if the type 422 is a simple ingredient, then the default measurement unit 424 identifies the measurement unit associated with the simple ingredient. Each of the data sets 404, 406, 408 and 410 also includes specific data (for example, a number of calories for a given protein shake serving) or information (for example, name of a recipe or weight per measurement unit) that can be transmitted to or shared with other data sets to allow the processing of various data, and information to generate output information for the user who executes the recipe. Examples of output information are: a message, alert, update, or the result of a calculation. More particularly, the output information can result from the calculation of differences between the target or actual nutritional data of simple ingredients and the impact on the nutritional information, for example, as displayed on the nutritional panel 110. Additionally, the output information can result from an event trigger that necessitates the issuance of an alert to a user. An example of this trigger is when a recipe target nutrition for a simple ingredient is different than the actual nutrition based on the actual weight measurement of the simple ingredient as detected by the scale 104. Examples of differences are as follows: the actual nutrition of the ingredient is less than the targeted amount or greater than the targeted amount. The system can determine that the actual nutrition of the ingredient is less than the target nutrition of the ingredient when, for example, a time delay elapses while the scale anticipates the addition of more of the ingredient. The system can then present to the user a request for a confirmation that the current amount is complete, and thereafter proceed to calculate the actual nutrition versus the target amount for the purposes of determining whether the simple ingredient actual nutrition is within the threshold of the target amount, as described further below regarding FIGS. 7A-7C.

The processing of a specific combination of data and information can be triggered as a result of a user command, user input, recipe-prescribed user action, or user selection from a smart app 202 menu or menu options via a user interface 105, or by one or more signals detected by one or more system sensors. The data structure 400 includes the following data sets: recipe group 402, recipe 404, container 406, ingredient 408 (including data associated with one or more simple ingredients), action 410, and tool 412. The data sets 402, 404, 406, 408, 410, and 412 show various data and information such as ingredient types including simple ingredients, default measurement units including the number of measurement units related to the simple ingredient, names, images, descriptions, categories, user notes, ratings, digital rights, portion names, portion containers, types, size or shape, color, default measurement unit, density, nutrition, sections, timer, transfer, instructions and parameters. The data sets can be stored in the same or different electronic storage media.

Figure 5A:
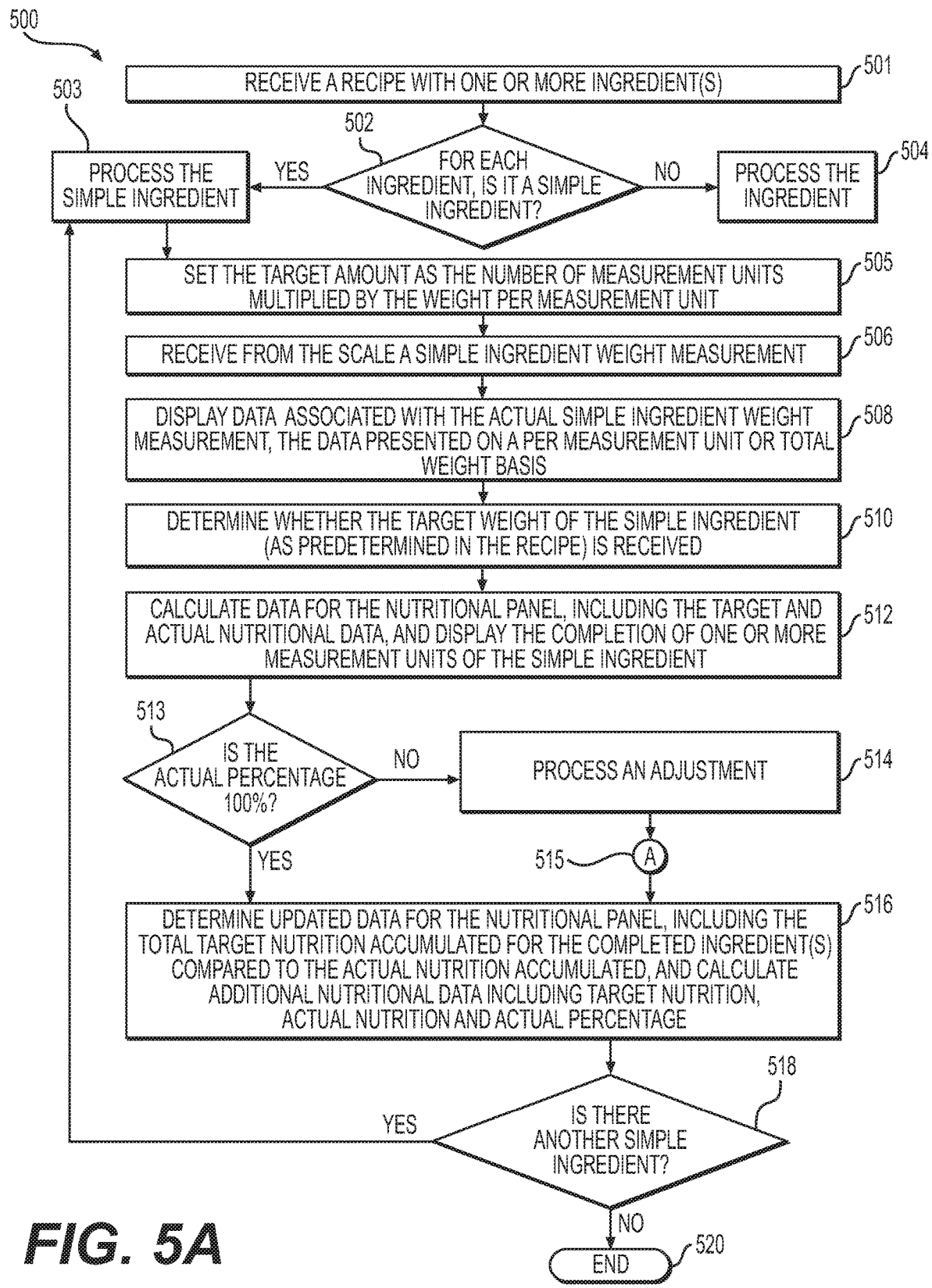
FIGS. 5A-B are flow diagrams showing processes for implementing the system.
Figure 5B:
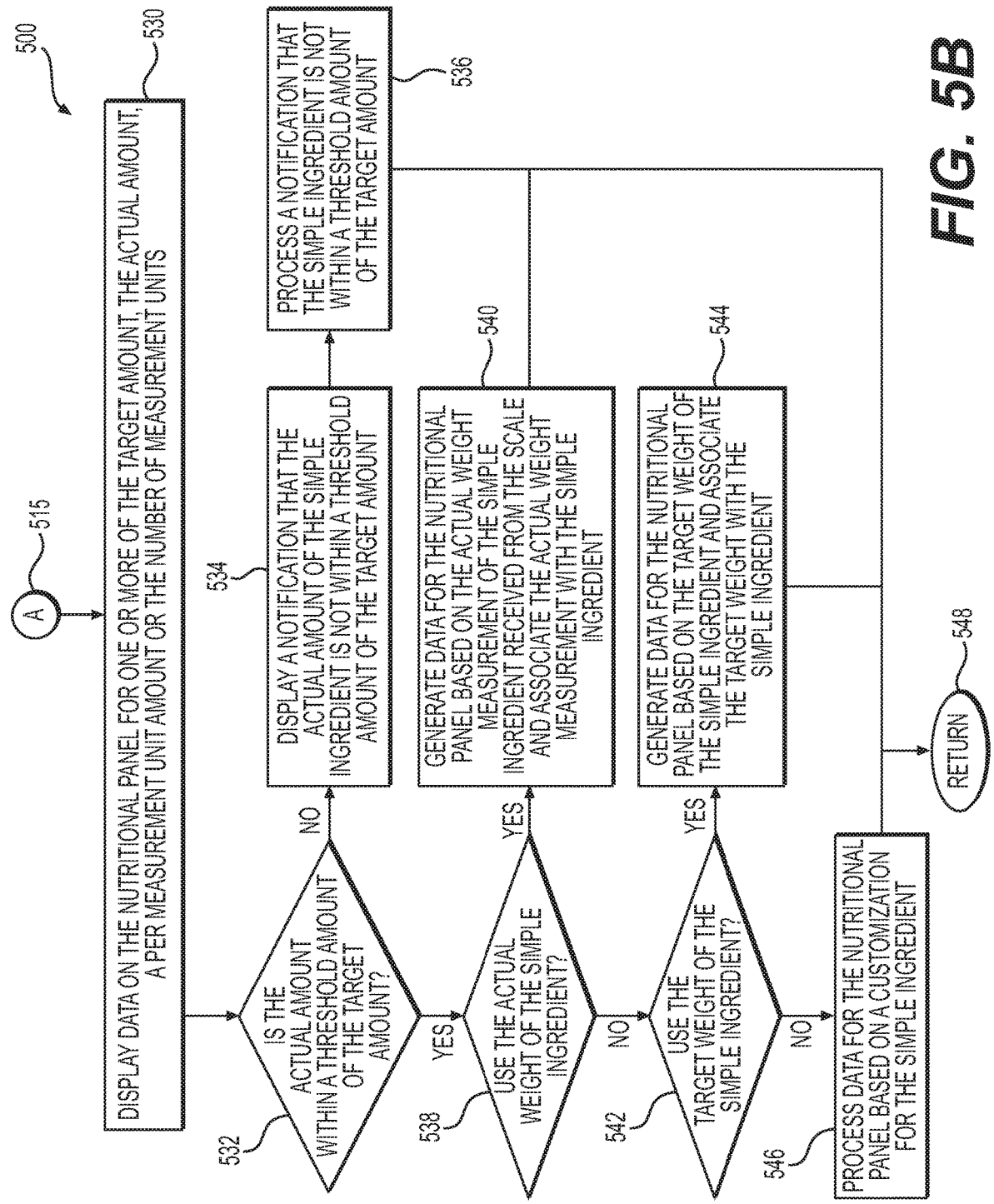

FIGS. 5A-B are flow diagrams showing processes for implementing the system 100. In the context of software, the blocks represent computer-executable instructions stored on one or more computer-readable media that, when executed by one or more processing measurement units (such as hardware microprocessors), perform the recited operations. Generally, computer-executable instructions include routines, programs, objects, components, data structures, and the like, that perform functions or implement particular abstract data types. The order in which the operations are described is not intended to be construed as a limitation on the embodiments of the invention. A client device, a remote content-item service, or both, may implement the described processes. Diamonds represent an operation whereby the user selects a binary yes or no response based on information presented on an informational display. Circles denote a sub process.

FIG. 5A is a flow diagram showing a process 500 for detecting the actual weight measurement of a simple ingredient by the scale 104 and comparing the actual weight measurement to the target weight of the simple ingredient for display on the nutritional panel 110 and for further processing based on whether the actual weight measurement and the target weight are the same (i.e., the actual versus target is 100%) or different (i.e., a percentage greater or less than 100%). The target weight can be equated to a measurement unit weight for the total number of measurement units. The process 500 is illustrated as a collection of blocks in a logical-flow graph, which represents a sequence of operations that may be implemented in hardware, software, or a combination thereof. The blocks are referenced by numbers 501-520. Each of the operations 502, 513 and 518 represents the processing of a query with two paths for subsequent processing based on an affirmative answer to the query and, alternatively, a negative answer to the query.

In operation 501, recipe information is received that indicates predetermined ingredients. The predetermined ingredients can include one or more simple ingredients. Data collected in operation 501 is next provided to operation 502, whereby it is determined whether, for each ingredient of the recipe 106, the ingredient is a simple ingredient. If the ingredient is a simple ingredient, then at operation 503, the simple ingredient is processed. If the ingredient is not a simple ingredient, then at operation 504, the ingredient is further processed according to an approach for the recipe 106 for general ingredients (not shown). Operation 503 then prompts operation 505, where a target weight can be set based on a number of measurement units of the simple ingredient (provided in data set 422, as one example of a source for measurement unit data for the simple ingredient) multiplied by a weight per measurement unit (provided in data set 424, as one example of a source for the weight per measurement unit data for the simple ingredient). The processing continues at operation 506, where an actual weight measurement of the simple ingredient is received from the scale 104. Then, in operation 508, data for display on the actual nutrition 115 of nutritional panel 110 and/or the recipe ingredient blocks 112 (or alternative display areas of the display 105) is calculated, including the actual weight measurement of the simple ingredient and nutrient data for actual nutrition 115 based on the actual weight measurement. The data can also be presented in alternative formats, such as on a per measurement unit or total weight basis, and these formats can correspond to data associated with the representation of the simple ingredient and/or measurement units of the simple ingredient presented on either one or both of the nutritional panel 110 or the display 107. Data collected in operation 508 is next provided to operation 510 whereby it is determined whether the target weight of the simple ingredient (as provided in the recipe 106 on a predetermined basis, or alternatively, provided by another source) is received. Then, in operation 512, the data for the nutritional panel 110 is calculated and displayed, including the nutrient data for the target nutrition 113 and the actual nutrition 115. In addition, the display 107 can include a representation of the completion of one or more measurement units of the simple ingredient. In this example, operation 512 supports a calculation that the target nutrition of the simple ingredient (as shown in the target nutrition 113) has been received when the actual weight measurement is within the threshold amount of the target or measurement unit weight of the simple ingredient. This is further described and shown in FIGS. 5B and 7A-7C below. Operation 512, based on an assessment of the threshold amount, also can support a general indication that one or more measurement units of the simple ingredient have been completed even when the actual weight measurement is not identical to the target weight of the simple ingredient.

In other examples of the process 500, the comparison between the actual weight measurement and the target weight of the simple ingredient can be calculated on an absolute basis of whether the actual weight measurement from the scale 104 is the same as the target weight of the simple ingredient presented in the recipe 106, regardless of whether the amounts are within a threshold amount or range of one another. In still further examples of the process 500, the ranges can be narrowed, extended or otherwise changed as a function of any of the following: the type of the simple ingredient (such as different fruit which has variations in size that are greater in some geographic locations versus other geographic locations), a nutrient amount related to the simple ingredient (such as the contribution of one or more nutrient amounts to the recipe 106, with the contribution of fiber, protein and/or fat as but a few examples), whether there are multiple simple ingredients in the recipe 106, whether the simple ingredient currently being processed (also called the "subject simple ingredient") is defined as a discrete measurement unit itself and/or based on a container for measuring the simple ingredient, and/or whether additional simple ingredient(s) in the recipe 106 besides the subject simple ingredient include any of the characteristics described above. In still further examples, where there are multiple simple ingredients, the following also can be considered: whether all simple ingredients are discrete measurement units themselves (such as two bananas) or one or more simple ingredients are instead presented based on a container for measuring the simple ingredient (such as one or more scoops of protein powder) or measured in another manner. In additional examples, the ranges can be extended, narrowed or otherwise changed and/or the target weight of the simple ingredient adjusted as a function of other ingredients in the recipe 106, including other simple ingredients. As a result, there can be a number of factors or variables related to the recipe 106, one or more ingredients in the recipe 106 (including simple ingredients and non-simple ingredients), nutrient amounts, or similar, which can impact the processing 500 as to comparing the actual weight measurement to the target weight of the simple ingredient. As a result, the present systems and methods contemplate changes in the processing of a single simple ingredient based on characteristics of the simple ingredient itself, as well as characteristics of other ingredients, whether or not simple ingredients and/or the recipe.

The process 500 continues at operation 513, whereby a determination is made as to whether the actual percentage (based on the comparison of the actual weight measurement to the target weight of the simple ingredient) is 100%. In operation 514, if the actual percentage is not 100%, then an adjustment can be executed for the simple ingredient. In this example, the adjustment can include selecting one of the actual weight measurement provided by the scale 104 or the target weight of the simple ingredient to associate or assign to the simple ingredient in the recipe 106. The adjustment is executed by invoking sub process A 515, which is described further regarding FIG. 5B.

Where, based on the query of operation 513, the actual percentage based on the comparison of the actual weight measurement to the target weight of the simple ingredient is 100%, operation 516 then is executed. In operation 516, additional calculations related to nutrient amounts for the target nutrition 113 and the actual nutrition 115 are triggered. These additional calculations, in this example, can include calculating the total target nutritional data for the total recipe 106 and a comparison between the nutrient data for the target nutrition 113 and the actual nutrition 115 on the basis of the total recipe 106. The data can then be displayed on the nutritional panel 110 and/or the display 107, or using alternative display locations or formats (not shown).

At operation 518, after the completion of the updated data for one or more nutrient data of the target nutrition 113 and the actual nutrition 115 for any of the individual simple ingredient and/or the total recipe 106, it is determined whether there is another simple ingredient to process. If the result is affirmative, operation 503 is invoked which returns the process 500 to operation on the next simple ingredient.

If the result is negative, then there is not another simple ingredient and operation 520 is invoked to end the processing.

FIG. 5B is a flow diagram showing a continuation of the process 500 sub process A for providing feedback based on the actual weight measurement of the simple ingredient and/or adjusting one or more nutrient amounts based on the feedback. The FIG. 5B process 500 is illustrated as a further collection of blocks in a logical-flow graph, which like FIG. 5A represents a sequence of operations that may be implemented in software, or a combination thereof. The blocks are referenced by numbers 530-548. Each of the operations 532, 538 and 542 represents the processing of a query with two paths for subsequent processing based on an affirmative answer to the query and, alternatively, a negative answer to the query.

The process 500 is initiated based on sub process A at operation 515 with the following data provided based on the processing in FIG. 5A: the actual weight measurement and the target weight of the simple ingredient for a subject simple ingredient and the actual percentage of the actual weight measurement versus the target weight being less than or greater than 100%. The processing then continues with operation 530. In this operation 530, data is displayed in one or more areas of the user interface 105, including the nutritional panel 110 and/or the display 107. In this example, the data includes the target weight of the simple ingredient and the actual weight measurement. The data also can include a presentation on the basis of the total simple ingredient and/or on a per measurement unit basis, for the number of measurement units that have been completed. For example, this data can be displayed for each of a multiple measurement unit (for example, for a first unit, a second unit, a third measurement unit etc.). Additional data can be substituted or added to any of the nutritional panel 110 and/or the display 107, including the recipe ingredient block 112 for the simple ingredient. The processing then continues with a determination in operation 532 of whether the actual weight measurement (as one of the nutrient data used to calculate the data presented in the actual nutrition 115) is within a threshold amount of the target weight of the simple ingredient (as one of the nutrient data used to calculate the data presented in the target nutrition 113). If the result is affirmative, operation 538 is invoked. If the result is negative, then operation 534 is invoked.

In operation 534, data is displayed on the user interface 105 on one or both of the nutritional panel 110 and/or the display 107. The data can include a notification that the actual weight measurement detected by the scale 104 or nutrient data of the actual nutrition 115 of the simple ingredient is not within a threshold amount of the target weight or another nutrient data of the target nutrition 113. Operation 536 is then prompted with a notification that the simple ingredient is not within the threshold amount of the target nutrition 113. The operation 536 processing relates to the detection and processing of an actual weight measurement detected by the scale 104 for a simple ingredient that is outside of the threshold range of the target weight of the simple ingredient associated with the recipe 106. This processing can then prompt a notification and adjustment of the simple ingredient, recipe 106 or other characteristic of the recipe 106 and/or an error-based operation (not shown).

Where the result of the operation 532 query is affirmative, then the processing 500 continues with an additional query. The process 500 then invokes operation 538, whereby it is determined whether to associate the actual weight measurement of the simple ingredient with the weight of the simple ingredient for purposes of further processing of the recipe 106, as well as other processing. If the determination is affirmative, operation 540 is invoked. Then, in operation 540, data for display on the actual nutrition 115 of nutritional panel 110 and/or the recipe ingredient blocks 112 (or alternative display areas of the display 107 and/or 105) is generated and displayed, including the actual weight measurement of the simple ingredient and/or nutrient data based on the actual weight measurement. In addition, the actual weight measurement of the simple ingredient can be associated with the weight of the simple ingredient for purposes of further processing of the recipe 106 by the system 100. In additional examples, the actual weight measurement also can be assigned or otherwise associated with the weight of the simple ingredient in the recipe 106. If the determination at operation 538 is negative, the process 500 continues with operation 542.

For operation 542, it is determined whether to maintain the target weight of the simple ingredient for purposes of further processing of the recipe 106. If the determination is affirmative, operation 544 is invoked. Then, in operation 544, data for display on the target nutrition 113 of nutritional panel 110 and/or the recipe ingredient blocks 112 (or alternative display areas of the display 107 and/or 105) is generated and displayed, including the target weight of the simple ingredient and nutrient data based on the target weight of the simple ingredient. In addition, the target weight of the simple ingredient can be associated with the weight of the simple ingredient for purposes of further processing of the recipe 106 by the system 100. The association of the target weight with the simple ingredient also can be executed by taking no action nor adjustment to the weight of the simple ingredient as predetermined in the recipe 106, as the target weight is the predetermined weight. In addition, the data provided in operation 544 can include a presentation on the basis of multiple measurement units that make up the target weight, such as, where the number of measurement units is greater than one.

If the operation 542 determination is negative, then operation 546 is invoked, and data is processed for the nutritional panel 110 based on data other than the target weight of the simple ingredient. In one example, a customization for the simple ingredient can be implemented as an adjustment to the simple ingredient and/or the recipe 106, as described above. In another example, the processing of operation 542 can be related to the processing of operation 536, or a notification and adjustment of the simple ingredient, recipe 106 or other characteristic of the recipe 106 and/or an error-based operation (not shown). Upon completion of operation 536, 540, 544 or 546, the process 500 then continues with operation 548, or a return to FIG. 5A processing from sub routine A.

For each of the data generation and display operations of FIGS. 5A and 5B, the data provided in any of the actual or target nutrition 115 or 113, respectively, or actual weight measurement or the target weight simple ingredient, can include a presentation on the basis of multiple measurement units that make up the target weight of the simple ingredient, such as, where the number of measurement units is greater than one. For example, where the simple ingredient target weight is based on four measurement units, such as 4 grapes, the processes in FIGS. 5A and 5B can be executed on the basis of each individual measurement unit or on the basis of the total of four measurement units for the simple ingredient. Where the process is executed for each individual measurement unit, in this example, it would be repeated 4 times and the display 105 can also include an individual depiction for each measurement unit to further inform the user of the multiple measurement unit characteristic of the simple ingredient and support the user in maintaining an accurate count as the individual measurement units (such as, individual grapes) are added to the container 130. This is further shown and described in FIG. 9B.

FIG. 6A is an exemplary nutrition information table 600 for an Almond Cookie recipe 106, with a reference to the location of the table 600 in the electronic storage of the simple ingredient computing module 201 and its interaction with the ingredient, simple ingredient, recipe and nutrition modules 206, 208, 210 and 212, respectively. The data also can be stored as metadata related to the recipe 106. The table shows nutritional data for each of the ingredients of the recipe 106, as well as the total recipe (in the row labeled "total"). Some of the nutritional data is shown in grams, including grams of protein, carbohydrates, and fat. Calories are shown as the number of calories. The first column 602 of the table, labeled "Almond Cookies Recipe: Ingredients," lists the names of the recipe ingredients, while the second column 604 shows the ingredient weights and corresponding percentage contribution to the total nutrient data for the recipe of each individual ingredient. The remaining columns show the nutrition values (in grams and percentage) of the following nutrients: protein 606, carbohydrates 608, total fat 610, as well as the number of calories 612 for each ingredient weight. FIG. 6A includes the following simple ingredient for processing in one example: 1 piece egg 614. For simple ingredients, such as the egg 614 simple ingredient in the recipe 106, the ingredient amount 604 can include a number of measurement units and/or a total weight of the simple ingredient. In other examples, this data can also include one or more of a weight per measurement unit and the number of measurement units, or similar. In still further examples, the simple ingredient can be presented without a weight amount, but rather a number of measurement units can be provided with a total weight measurement per the total number of measurement units. Other measurements such as volume can be used in addition to or instead of weight. In additional examples, other measurements can be used, such as other nutrient data derived from other standard measurements of the simple ingredient. There are a variety of sources from which the measurement of a simple ingredient can be derived, with weight measurement being used as one example. In this example, the egg 614 simple ingredient includes an amount represented both a measurement unit with a number of measurement units of one "1 PC" (or piece) and a weight of 57 grams is used to generate the following nutrient data: 6.29 g of protein, 0.38 g of carbohydrates, 4.97 g of fat, and 74 the number of calories.

In some examples, the nutrient data includes the corresponding percentage contribution to the total nutrient data for the recipe of each individual ingredient. The nutrient percentages are calculated by dividing the nutritional weight of an ingredient by the total weight of the nutritional component shown in the last row of a nutrient column. For example, the percentage of protein from egg 614 in the recipe is calculated by dividing 6.29 g by the total protein content of the entire recipe (40.42 g). Row 614 shows that for 1 piece or 57 grams of egg 614 per (or 11% of the total weight of the recipe 106) equates to 16% of protein, 0.2% of carbohydrates, 4% of fat, and 3% for the number of calories relative to the total recipe 106.

Figure 6B:
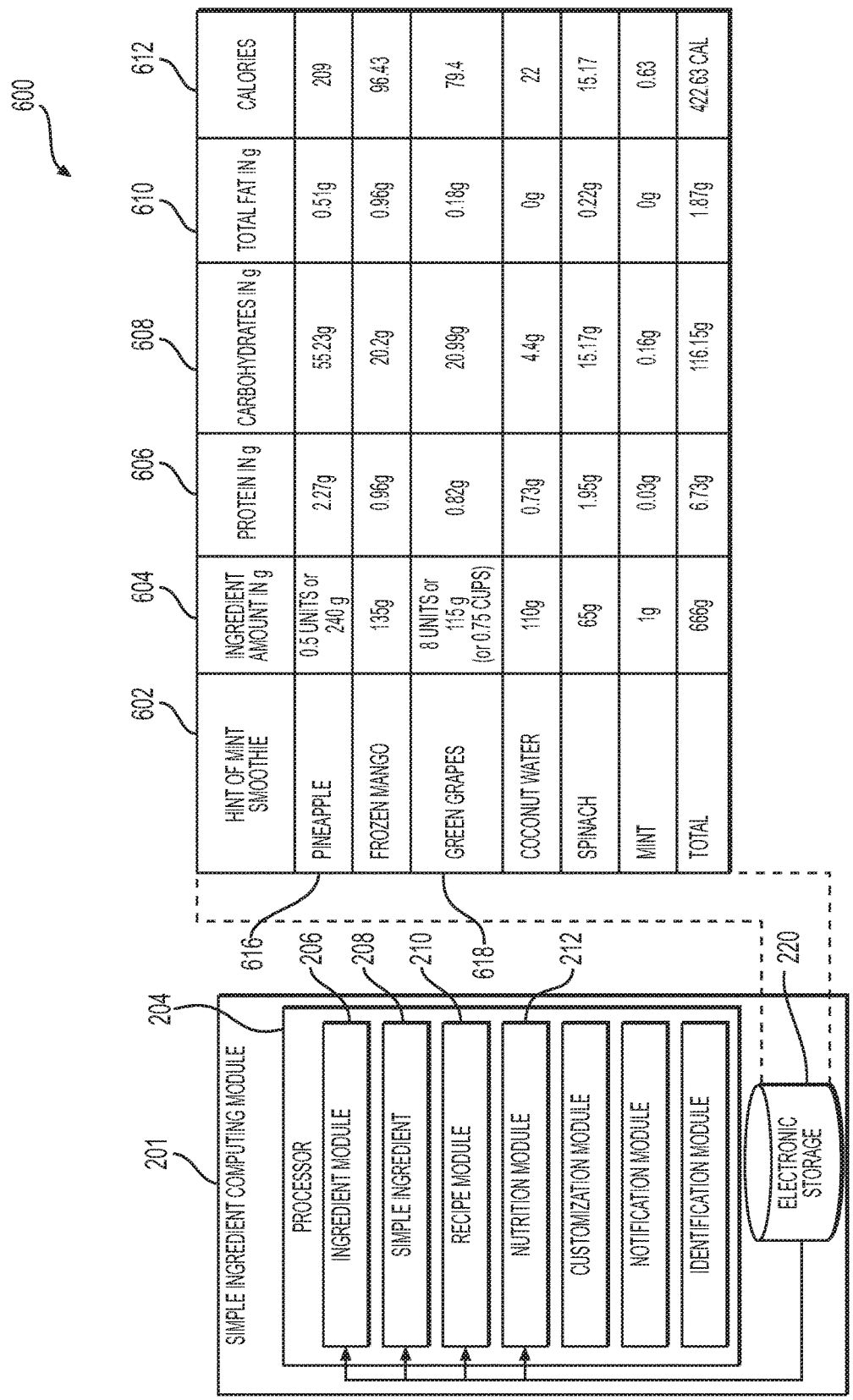

FIG. 6B is another exemplary nutrition information table 600 for a Hint of Mint recipe 106, based on the same structure and functional relationships as the FIG. 6A table 600. FIG. 6B includes the following simple ingredients for processing in one example: pineapple 616 and grapes 618. Other ingredients also can be treated as simple ingredients based on their presentation to the user and processing. For example, mango can also be defined on a measurement unit basis or measured based on a container for measurement, such as a 2 cups, 1 cup or ½ cup measurement, or similar. As other examples, spinach also can be defined by measurement units including one bunch, handful, and/or counted based on individual leaf counts or on a container for measurement, such as 1 cup, ½ cup, or similar. For yet another example, mint leaves can be treated as a simple ingredient in the same manner as one or more of the measurement approaches as spinach. As a result, the designation of an ingredient as a simple ingredient can derive from the recipe 106 as predetermined by the author of the recipe 106, and/or based on a number of factors including the measurement objectives for the ingredient and the optimized measurement approach, such as based on weight, volume, density, and/or relationship to other ingredients in the recipe 106.

For the FIG. 6B exemplary pineapple 616 and grapes 618 simple ingredients, the ingredient amounts 604 are 0.5 measurement units and 8 measurement units (or 0.75 cups), respectively. The simple ingredient amounts are presented based on both a number of measurement units and a weight in grams, such as for pineapple 616, 0.5 measurement units or ½ of a pineapple (or 240 g) and 8 measurement units or a container for measurement of the simple ingredient of 0.75 cups (or 115 g) for grapes 618. FIG. 6B also shows corresponding nutrient amounts in each of protein 606, carbohydrates 608, total fat 610 and the number of calories 612. The corresponding nutrient amounts calculated for each simple ingredient amounts are as follows: the pineapple 616 simple ingredient includes 2.27 g of protein, 55.23 g of carbohydrates, 0.51 g of fat, and 209 calories; and the green grapes 618 simple ingredient includes 0.82 g of protein, 20.99 g of carbohydrates, 0.18 g of fat, and 79.4 calories.

Figure 7B:
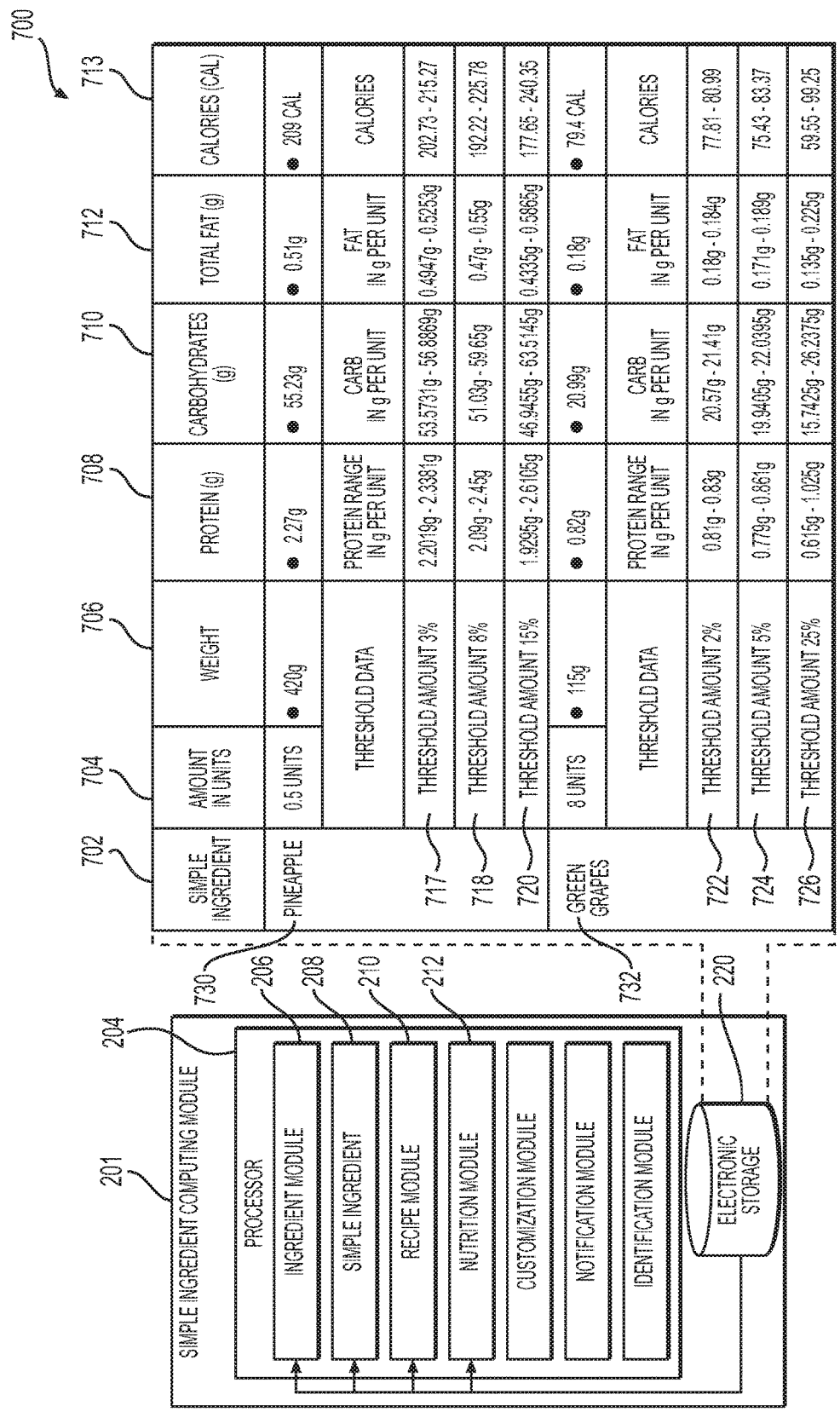
Figure 7C:
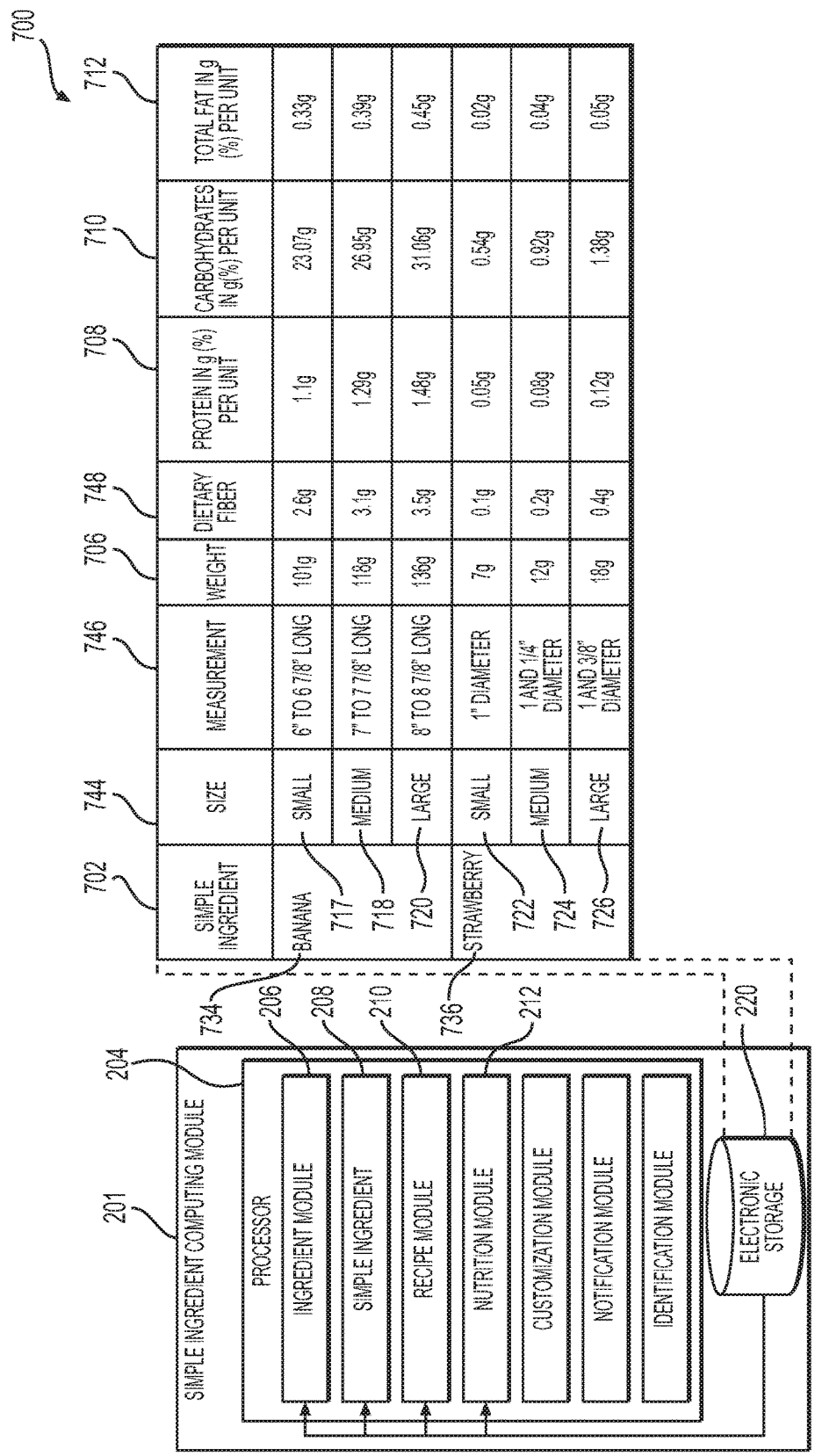

FIGS. 7A-7C are simple ingredient nutritional information tables 700 for the purpose of presenting examples for generating and processing threshold amounts relative to the target or measurement unit weights of simple ingredients. As described above, the methods and systems 100 can process whether the actual weight measurement of simple ingredients detected by the scale 104 are within a threshold amount of the target weight of the simple ingredient. FIG. 7A is an exemplary simple ingredient nutrition information table 700 for the simple ingredient egg 714 of the Almond Cookie recipe 106. FIG. 7B is another exemplary simple ingredient nutrition information table 700 for the simple ingredients pineapple 730 and grapes 732 of the Hint of Mint Smoothie recipe 106. FIG. 7C is an exemplary simple ingredient nutrition information table 700 for the simple ingredients bananas 734 and strawberries 736 of a blended smoothie recipe 106. Each of the FIGS. 7A-7C tables 700 present a range for each nutrient data as an example of a range for the threshold amount that will satisfy the target nutrient data for the ingredient. This range for nutrient data presented in FIGS. 7A-7C also can be presented in the nutritional panel 110, including for example, with two data points for each nutrient data of the target nutrition 113 (not shown).

FIG. 7A is an exemplary simple ingredient nutrition information table 700 for the simple ingredient egg 714 of the Almond Cookie recipe 106. FIG. 7A also includes a reference to the location of the table 700 in the electronic storage of the simple ingredient computing module 201 and its interaction with the ingredient, simple ingredient, recipe and nutrition modules 206, 208, 210 and 212, respectively. The data also can be stored as metadata related to the recipe 106. The table shows additional nutritional data for the egg 714 simple ingredient of the recipe 106. The first column 702 of the table, labeled "Simple Ingredient," lists the simple ingredient presented in recipe 106 for Almond Cookies. The second and third columns 704 and 706 show the ingredient amount in the number of measurement units and weights, respectively. The subsequent columns present the nutrients: protein 708, carbohydrates 710, total fat 712, as well as the number calories 713. In addition, the table provides exemplary threshold amounts for the simple ingredient based on a percentage range to determine whether the actual nutrition 115 of a simple ingredient is within the target nutrition 113. The calculation of threshold amounts related to the simple ingredients in this case is based on the weight of the simple ingredient. In other examples, the simple ingredients can be based on other nutrient data. More particularly, where the actual nutrition 115 is based on an actual weight measurement from the scale 104, the threshold amount can be applied to create a range relative to the target nutrition 113, as provided for the simple ingredient in the recipe 106. Where the actual weight measurement is within this range, then in one example, the process 500 can determine that the actual weight measurement is within the threshold amount of the target weight of the simple ingredient. As further described regarding FIG. 5B, the determination that the actual weight measurement is within the threshold amount of the target weight of the simple ingredient can result in the one of the actual weight measurement or the target weight of the simple ingredient being associated with the simple ingredient for further processing of the recipe 106. Exemplary threshold amounts shown in the FIG. 7A table are 4% (shown in row 717), 10% (shown in row 718) and 20% (shown in row 720), with the application of the threshold amount applied to nutrient data such as weight 706, protein 708, carbohydrates 710, total fat 712, as well as the number calories 713, in order to present a range of amounts on a per nutrient basis. Therefore, where the nutrient data is within the range presented based on a selected one of the threshold amounts in rows 717, 718 or 720, and then the nutrient data is within the threshold of the target nutrition 113.

These threshold amounts are exemplary. For example, where the threshold amount of 10% in row 718 is selected, the actual weight measurement that can support a calculation by the smart app 202 that the actual weight measurement is within the threshold amount of the target weight of the simple ingredient, is between 54.72 g and 59.28 g. Using the same threshold amount of 10%, nutrient data can be calculated based on the same range, such as a range of fat from 4.473 g to 5.467 g. The selection of the percentage amount, as well as the choice between threshold amounts can be based on metadata associated with the recipe 106 that can also be included in the tables in FIGS. 6A and 7A, other sources of data for the recipe 106, selection by the user, or similar. In one example of the system and methods 100 for the present disclosure, the following factors can impact the variation in measurements of ingredients and, therefore, can be applied in the determination of the threshold amounts: the geographic location of the simple ingredient, the variety of the simple ingredient, the time of year during which the simple ingredient is used, the time from harvesting the simple ingredient until use in the recipe, and/or change in weight based on factors related to one of the acquisition, transportation, or use of the simple ingredient, or similar.

FIG. 7B is an additional exemplary simple ingredient nutrition information table 700 for the simple ingredients of pineapple 730 and green grapes 732 for the Hint of Mint recipe 106, based on the same structure and functional relationships as the FIG. 7A table 700. Exemplary threshold amounts shown in the FIG. 7B table are 3% (shown in row 717), 8% (shown in row 718) and 15% (shown in row 720) for pineapple 730 and 2% (shown in row 722), 5% (shown in row 724) and 25% (shown in row 726) for green grapes 732, with the application of the threshold amounts then applied to nutrient data, including protein 708, carbohydrates 710, total fat 712, as well as the number calories 713 for each of the simple ingredients. In addition, in this example, a range of weights for the weight column 706 is not shown. Rather, the data presented is for the nutritional panel 110. In other examples, a range of weights for the weight column 706 can be included and also presented on the user interface 105, such as, for example, on the nutritional panel 110. The FIG. 7B exemplary threshold amounts differ from the FIG. 7A threshold amounts, and the threshold amounts can differ for the same simple ingredient in one or more recipes 106, as the threshold amounts are a function of a number of factors which can vary based on the recipe 106, user, geographic location in which the recipe 106 is executed, or similar, and the threshold amount can be adjusted on a predetermined basis and incorporated into the recipe 106 or other source of data associated with the receipt 106, including for example recipe 106 metadata. In other examples, the threshold amount can be changed during execution of the recipe 106. Similar to FIG. 7A, FIG. 7B also provides a range of nutrient data based on the threshold amounts, such as, for example, where the threshold amount of 3% for pineapple 730 (shown in row 717) is selected, a carbohydrate amount which can support a calculation by the smart app 202 that the actual weight measurement is within the threshold amount of the target weight of the simple ingredient, is between 53.5731 g and 56.8869 g. As another example, where the threshold amount of 25% for green grapes 732 (shown in row 726) is selected, a total fat amount that can support a calculation by the smart app 202 that the actual weight measurement is within the threshold amount of the target weight of the simple ingredient, is between 0.135 g and 0.225 g.

There are a variety of bases for calculating the threshold amounts and approaches to measuring them. The approaches can include one or more accommodation functions by the smart app 202 in order to deal with variations in the weight, volume or density (as well as other measurements) of a discrete ingredient. For example, a recipe can include as one ingredient one banana. But metadata for the recipe 106 may specify a minimum and a maximum weight or volume for the banana. For example, a recipe 106 for a blended smoothie may specify a banana as an ingredient, but if the amount of banana is too small or too large, then the texture of the smoothie may be adversely affected. The smart app 202 can determine one or more expected densities for the banana and determine the volume of the added banana based on the measured weight of the banana. The analysis can produce a threshold amount for the banana, including a minimum and maximum, which can be encoded in the metadata for the recipe 106.

Another accommodation function that a smart app 202 can perform is to allow for automatic or semi-automatic adjustment of other ingredients of a recipe, or the total recipe (such as, for example, based on scaling the recipe). This can be done to meet nutritional requirements based on an actual weight of one or more simple ingredients and/or a threshold amount of a simple ingredient, as well as a determination of whether an actual weight measurement is within a target weight of a simple ingredient. One example of nutritional requirements is an overall nutritional goal for a recipe 106 or for one or more ingredients, such as a target dietary fiber. A recipe may specify a threshold amount based on a minimum and a maximum for a specific nutrient, such as protein, carbohydrates, fat and/or the number of calories, dietary fiber, or similar. In one example, a user may elect to execute a recipe for a blended smoothie with a target nutritional data of a dietary fiber. The blended smoothie recipe 106 in this example contains two recipe simple ingredients, one banana and six strawberries. The simple ingredients can be represented as indications on a display specifying discrete ingredients. FIG. 7C is another exemplary simple ingredient nutrition information table 700 for this blended smoothie recipe 106 that includes another approach to presenting threshold amounts for simple ingredients. The table shows nutritional data for each of the banana 734 and strawberry 736 simple ingredients of the recipe 106. In addition, as the objective of this recipe 106 execution is based on dietary fiber (with a primary basis of the size of the ingredients), the data in the FIG. 7C table 700 can reflect the nutrient data that is salient to the recipe 106 and/or recipe 106 execution objectives. The additional or alternative nutrient data can support other approaches for determining threshold amounts, such as is shown here on the size and/or measurement of the simple ingredient. As a result, three columns are added to this FIG. 7C table, including size 744, measurement 746 and dietary fiber 748, in addition to the table also presenting the weight 706 and other nutrient data, including protein 708, carbohydrates 710 and fat 712. For example, the actual weight measurement from the scale 104 can be processed to identify the corresponding size 744 and dietary fiber 748. In other examples, the simple ingredient can be scanned as another basis to identify dimensions and identify the correct entry for the simple ingredient on the table 700. In yet another example, the user interface 105 can provide the user with a data entry or selection option, such as a selection of small, medium or large, for the simple ingredient, and/or additional data which can be relevant to ascertaining measurement data, such as the geographic location of production or use of the simple ingredient and/or the time from harvest to use, or similar. The FIG. 7C table shows each of the threshold amount bases as small (shown in row 717 for the banana 734 ingredient and in row 722 for the strawberry 736 ingredient), medium (shown in row 718 for the banana 734 ingredient and in row 724 for the strawberry 736 ingredient) or large (shown in row 720 for the banana 734 ingredient and in row 726 for the strawberry 736 ingredient). The table 700 also provides nutrient data for each of the measurement 706 amounts, such as for a medium banana 734 defined as 7" to 7⅞" long (shown in row 718), the weight 706 is 118 g, the protein 708 is 1.29 g, the carbohydrates 710 is 26.95 g and the fat 712 is 0.39 g. As another example, for a large strawberry 736 defined as 1 and ⅜" diameter (shown in row 726), the weight 706 is 18 g, the protein 708 is 0.12 g, the carbohydrates 710 is 1.38 g and the fat 712 is 0.05 g. In addition, threshold amounts, such as those presented for each of the simple ingredients in FIGS. 7A and 7B can be added to each of the banana 734 and strawberry 736 entries. The threshold amounts can be the range of nutrient data for the simple ingredient between small to large sizes, such as a dietary fiber range for a banana of 2.6 g to 3.5 g, or for each strawberry of 0.1 g to 0.4 g. Where the actual weight measurement of the simple ingredients of a banana and strawberries are detected by the scale 104 and the nutrient data, such as the target dietary fiber, is generated, the actual and target nutrition 115 and 113, respectively are compared. Where nutrient data such as dietary fiber, based on the actual weight measurement, is not within the threshold range as specified based on the size of the simple ingredient, then the smart app 202 can present to the user a notice of the discrepancy and/or a suggestion that a different size of one or more simple ingredients, or additional simple ingredients, should be used. For example, where the scale 104 detects that the size of a banana is small such that it falls short on the target contribution for dietary fiber, then the smart app 202 can provide a notice to suggest that large size strawberries be used, that additional portions of or whole bananas or strawberries be used (not shown), or that the total dietary fiber for the blended smoothie recipe 106 is different than the target nutrition. Notifications where the actual nutrition 115 is outside the threshold amount of the target nutrition 113 is described further regarding FIG. 5B processing where actual nutrition 115 is outside the threshold of target nutrition 113.

In a further example, the simple ingredients of recipe 106 can be combined into a total dietary fiber goal as contributed by the aggregation of both simple ingredients. For example, the total dietary fiber threshold amount can be a minimum of one small banana 2.6 g plus six small strawberries of 0.1 g each multiplied times 6 or 0.6 g, for a total minimum of 3.4 g, and a maximum of one large banana 3.5 g plus six large strawberries of 0.4 g each multiplied times 6 or 2.4 g, for a total minimum of 5.9 g. The actual weight measurement detected by the scale 104 supports the calculation of nutrient data, including the total dietary fiber. The smart app 202 can provide notice of the discrepancy and/or add an additional recipe ingredient block 112 for an ingredient to add fiber to the recipe (not shown). For example, at the conclusion of adding the banana and strawberries, the smart app 202 then determines that the total fiber provided by these two discrete ingredients is less than the desired target nutritional data goal for fiber of 3.2 g, and the smart app 202 can calculate suggested actions, such as adding additional strawberries or a portion of or a full banana (such as a small banana or ½ banana). Where the smart app 202 adds an ingredient, it can be processed as follows: an additional recipe ingredient block 112 specifies a target weight of the additional ingredient, such as an additional strawberry. The smart app 202 also can determine that there are no remaining ingredients to be added to the recipe 106 in order to fill the discrepancy in fiber to meet the desired fiber goal. In yet another example, a new ingredient, such as oat bran can be added. This new ingredient can provide a more precise measurement of the dietary fiber needed to increase the dietary fiber to within the threshold amount of the total dietary fiber of the recipe 106. The addition of a compensatory recipe ingredient block 112 to achieve a desired nutrition goal may be done automatically by the smart app 202, the user can be given the option of adding ingredients(s), and/or the user can be prompted to select from among a list of options for adding an recipe ingredient block 112 to achieve the desired target nutritional data goal. The alternative choices for achieving a desired nutritional data goal may be sourced from one or more of the following: encoded in the recipe 106 metadata and/or based on user preferences previously stored, user profile data retrieved from a server (not shown) which provides the recipe 106, and/or options for alternative nutrient sources stored on the server or based on data acquired by other approaches.

Figure 8A:
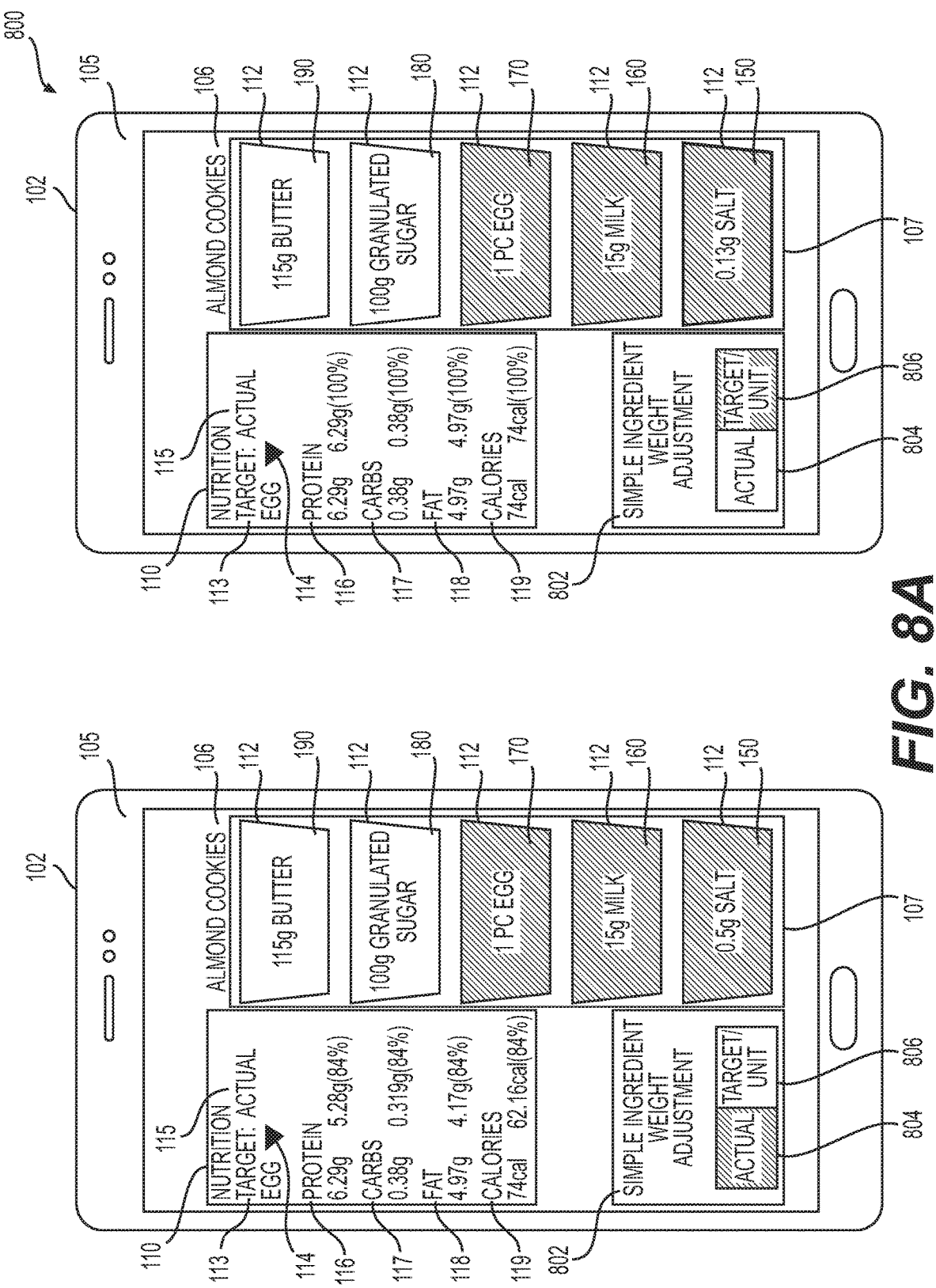
FIGS. 8A-8C are schematic diagrams of illustrative computing environment usable to provide a user interface display option for the nutritional panel and a user data entry selection of actual versus target or measurement unit weights of simple ingredients.
Figure 8B:
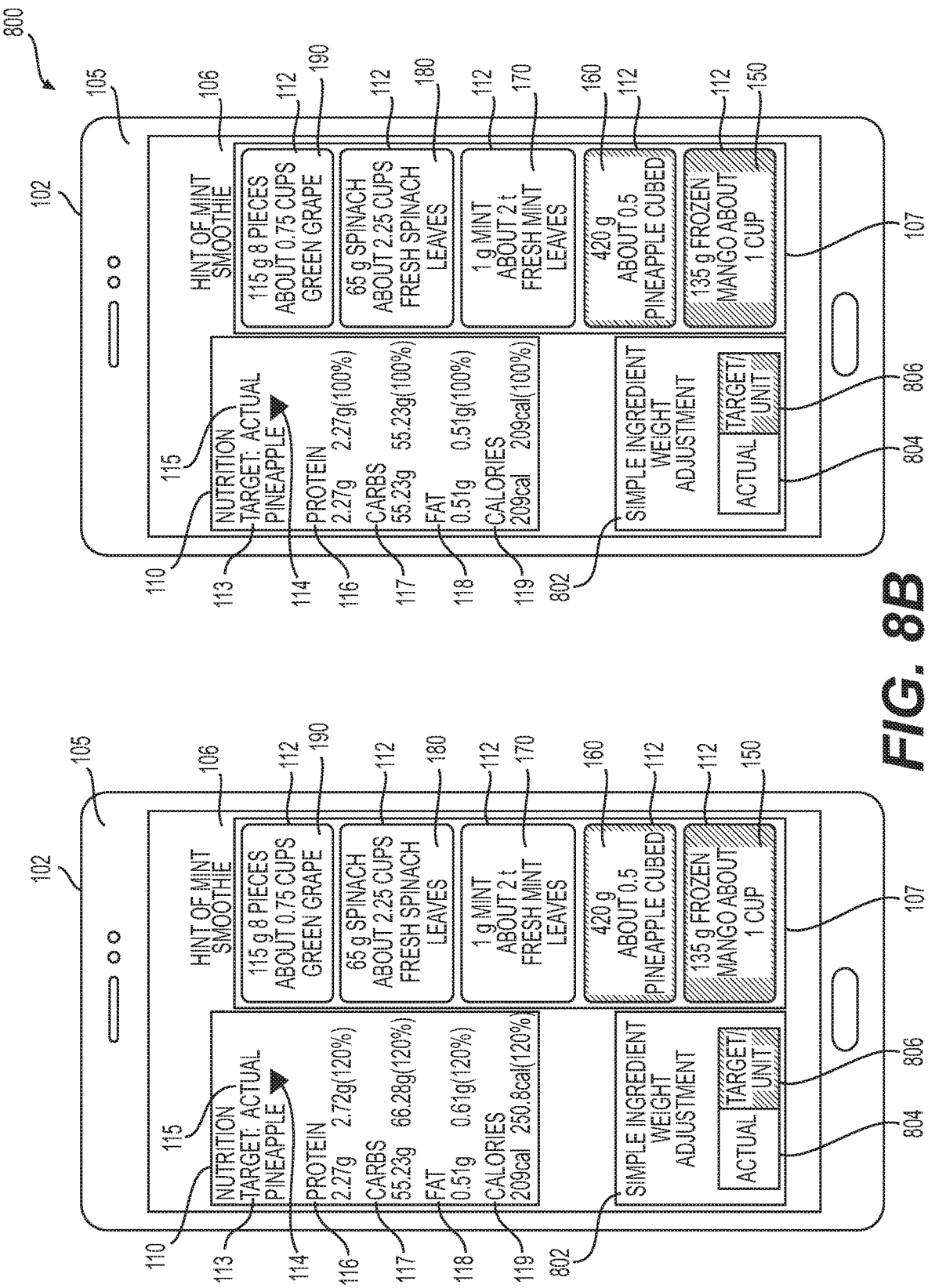
Figure 8C:
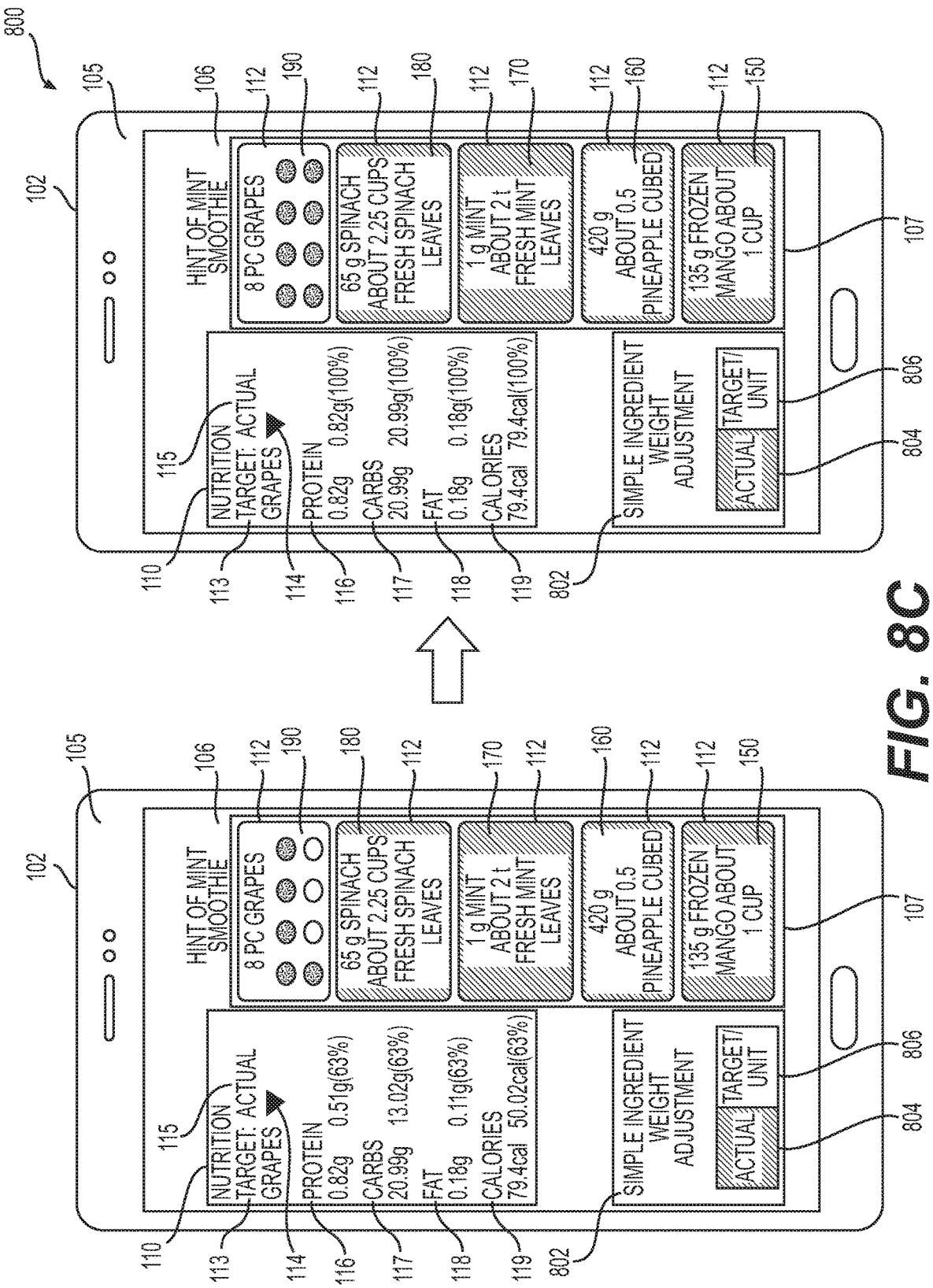

FIGS. 8A-8C are schematic diagrams of illustrative computing environments 800 usable to provide a user interface 105 display option for the nutritional panel 110 and a user data entry selection of actual versus target or measurement unit weights of simple ingredients. These figures also are illustrative examples of the components and functionality shown in FIGS. 1 and 3A-3B upon completion of adding specific simple ingredients for recipes 106 in the recipe column 107. FIG. 8A is directed to the completion of the egg 170 ingredient in the Almond Cookie recipe 106; FIG. 8B is directed to the completion of the pineapple 160 ingredient in the Hint of Mint Smoothie recipe 106; and FIG. 8C is directed to the completion of the grapes 190 ingredient in the same Hint of Mint Smoothie 106. The FIGS. 8A-8C components, including the user interface 105, display 107, recipe ingredient blocks 112 and nutritional panel 110 (including the target and actual nutrition 113 and 115, respectively, and the data entry field 114) are based on the same structure and functional relationships as in FIGS. 1 and 3A-3B. However, the user interface 105 of FIGS. 8A-8C adds an additional data entry option 802 for user selection of a weight for a simple ingredient, labeled "Simple Ingredient Weight Adjustment," including two data entry selections of the actual weight 804 (or the actual weight measurement received from the scale 104), labeled as "actual," or the target/unit weight 806 (or the target weight simple ingredient as predetermined in the recipe 106 or provided by the recipe 106 metadata or another source), labeled as "target/unit." Each of the figures also includes two examples of a simple ingredient, the data displayed on the nutritional panel 110, including the target nutrition 113 and the actual nutrition 115, and a selection received in the simple ingredient weight adjustment data entry option 802 of either the actual 804 or the target/unit 806 selection.

FIG. 8A shows that three ingredients of the Almond Cookie recipe 106 are completed based on highlighting the recipe ingredient block 112 for the relevant ingredient, such as, shown here for each of salt 150, milk 160 and egg 170. The data entry field 114 is shown with a selection of the egg 170 ingredient and the target nutrition 113 is shown as the same for both examples, the left user interface 105 and the right user interface 105, while the actual nutrition 115 and the data shown for the actual nutrition 115 differ. In the left user interface 105 example, the actual weight measurement of the egg 170 ingredient has prompted a calculation of nutrient data shown in the actual nutrition 115 that is 84% of the target nutrition 113 amounts. This also equates to an actual weight measurement from the scale of 84% of the target weight of the simple ingredient. The simple ingredient weight adjustment data entry option 802 shows a selection of the actual 804 selection in this example. In addition, either the actual 804 or target/unit 806 selection can be a default setting so that the user need only toggle or select an alternative of actual or target/unit if the user selects an alternative to a default selection. In other examples, there are a number of ways to prompt input from the user about the selection of nutrient data for the actual versus the target of the simple ingredient, which can result in alternative data selection or entry options than the approach shown here as option 802.

In addition, the smart app 202 also can apply the threshold amount processing to determine whether the actual weight measurement of 84% of the target weight is within the threshold amount of the target weight. Returning to FIG. 7A, where the threshold amounts in rows 716 or 718 of 4% or 10%, respectively, are used, then the smart app 202 in this example would calculate that the actual weight measurement from the scale 104 is not within the target weight of the simple ingredient. However, where the threshold amount in row 720 of 20% is used, then the smart app 202 in this example would calculate that the actual weight measurement from the scale 104 is within the target weight of the simple ingredient, or, for example, the value of 5.28 g of protein is within the threshold amount in row 720 of 5.032 g-7.548 g. The use of threshold amounts can further inform the option 802 and/or the selection of the actual 804 or target/unit 806 selection can be performed on an automated basis using the threshold amount processing, as described in FIGS. 5B and 7A for this example. Further, in the right user interface 105 of FIG. 8A, the actual weight measurement from the scale 104 of the simple ingredient is set to 100% of the target weight simple ingredient, as the target/unit 806 selection is set as a default or selected by the user in the option 802.

FIG. 8B shows two examples where two ingredients of the Hint of Mint Smoothie recipe 106 are completed based on highlighting the recipe ingredient block 112 for the relevant ingredient, such as, shown here for each of mango 150 and pineapple 160. The data entry field 114 is shown with a selection of the pineapple 160 ingredient and the target nutrition 113 is shown as the same for both examples, the left user interface 105 and the right user interface 105, while the actual nutrition 115 differs between the two examples. In the left user interface 105 example, the actual weight measurement of the pineapple 160 ingredient has prompted a calculation of nutrient data shown in the actual nutrition 115 that is 120% of the target nutrition 113 amounts. This also equates to an actual weight measurement from the scale of 120% of the target weight of the simple ingredient. The simple ingredient weight adjustment data entry option 802 shows a selection of the target/unit 804 selection in this example. One basis for the selection of the target in this exemplary FIG. 8B processing is that the difference between the target and actual weight is too large such that the proportional contribution of the pineapple 160 simple ingredient to the other recipe ingredients is impacted. Using the exemplary table 700 in FIG. 7B for the pineapple can support this conclusion where threshold amount processing also is employed, as the threshold amounts in rows 717, 718 and 720, present that the maximum threshold amount range from the target weight is 15%. The 20% difference in FIG. 8B left user interface 105 is outside of the maximum threshold amount. Therefore, the user in this case selects the target/unit 806 selection in the option 802. Like the FIG. 8A right user interface 105, the FIG. 8B right user interface 105 also shows an example where the actual weight measurement from the scale 104 of the pineapple ingredient 160 and the target weight are the same, and therefore the option 802 target/unit 806 selection is shown.

FIG. 8C shows that five ingredients the Hint of Mint Smoothie recipe 106 are completed based on highlighting the recipe ingredient block 112 for the relevant ingredient, such as, shown here for each of mango 150, pineapple 160, mint 170, spinach 180 and grapes 190. The data entry field 114 is shown with a selection of the grapes 190 ingredient and the recipe ingredient block 112 also provides a depiction of the number of measurement units comprising the grapes 190 ingredient, of 8 individual depictions. It should be noted that the nutritional panel 110 is directed to the total for the grapes 190 ingredient in providing the nutrient data. However, in other examples, the nutritional panel 110 can present nutrient data for each individual measurement unit of the eight grapes comprising the total ingredient 190. In addition, the target nutrition 113 is shown as the same for both examples, the left user interface 105 and the right user interface 105, while the actual nutrition 115 differs. However, unlike the basis for the difference in FIGS. 8A and 8B, the difference in this case is due to presenting an accumulation of actual weight measurement from the scale 104 as each individual measurement unit of the grapes 190 ingredient is added to the scale. Therefore, with each measurement unit on a macro level assumed to weigh the same (and acknowledging that in examples, on a micro-level, individual grapes will have unique weights) and the recipe 106 providing a measurement unit count for the ingredient, the smart app 202 can calculate the number of measurement units of the grape 190 ingredient which are completed versus those measurement units that are not completed. As a result, the left user interface 105 presents that 5 of the 8 measurement units for the grapes 190 ingredient have been detected based on the actual weight measurement from the scale 104. Therefore, smart app 202 presents that the addition of the grapes 190 ingredient during execution of the recipe 106 is on track, with 63% of the grape 190 ingredient being completed. The option 802 therefore shows in this example the actual 804 selection as being selected. Then, the user interface 105 shows on the right user interface 105 that the full 8 measurement units of the grape 190 ingredient have been detected, with the actual versus target being 100%. The option 802 shows the actual 804 selection as being selected.

In another example of the processing depicted by FIG. 8C, the same processing as in FIGS. 8A and 8B of the comparison between the target nutrition 113 and the actual nutrition 115 can be calculated by the smart app 202 at the completion of the 8 measurement units of the grapes 190 ingredient. Where the actual versus the target are different, the smart app 202 can present the user with the selection of option 802, and each of the FIG. 7B threshold amounts in rows 722, 724 and 726, also can be applied to determine whether the actual weight measurement from the scale 104, and therefore the nutrient data is within the threshold amount of the target nutrition 113.

FIGS. 9A-9D are schematic diagrams of illustrative computing environments 900 usable to provide a user interface 105 display option for the recipe ingredient blocks 112 for simple ingredients, as well as a scale 104 and container 130. These figures further show a change to the representation of measurement units of the simple ingredient in the recipe ingredient block 112 as the simple ingredient is added to the container 130 on the scale 104.

The recipe ingredient block 112 can include individual representations of each individual measurement unit, which can be shown as measurement units that are completed versus measurement units that will be completed with the addition of more of the simple ingredient. Similarly, the measurement of the simple ingredient detected by the scale 104 can provide the data on an individual measurement unit basis as well as on the basis of the total simple ingredient, with nutrient data presented on the nutritional panel 110 for either each measurement unit or the total for the simple ingredient (not shown, and as further discussed above regarding FIGS. 8A-8C).

Figure 9A:
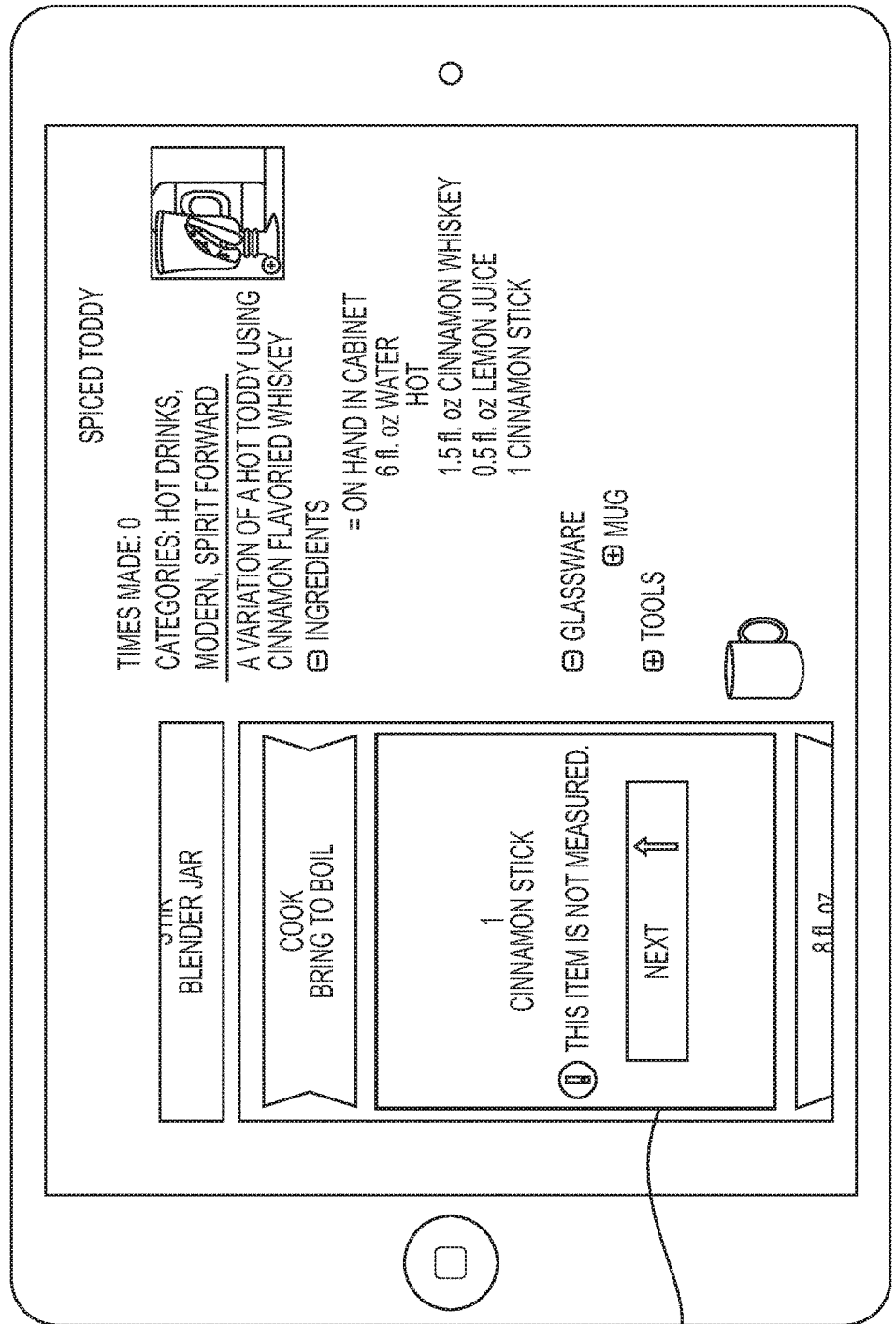
FIGS. 9A-9D are schematic diagrams of illustrative computing environments usable to provide a user interface display option for the recipe ingredient blocks for simple ingredients, as well as a scale and container.
Figure 9B:
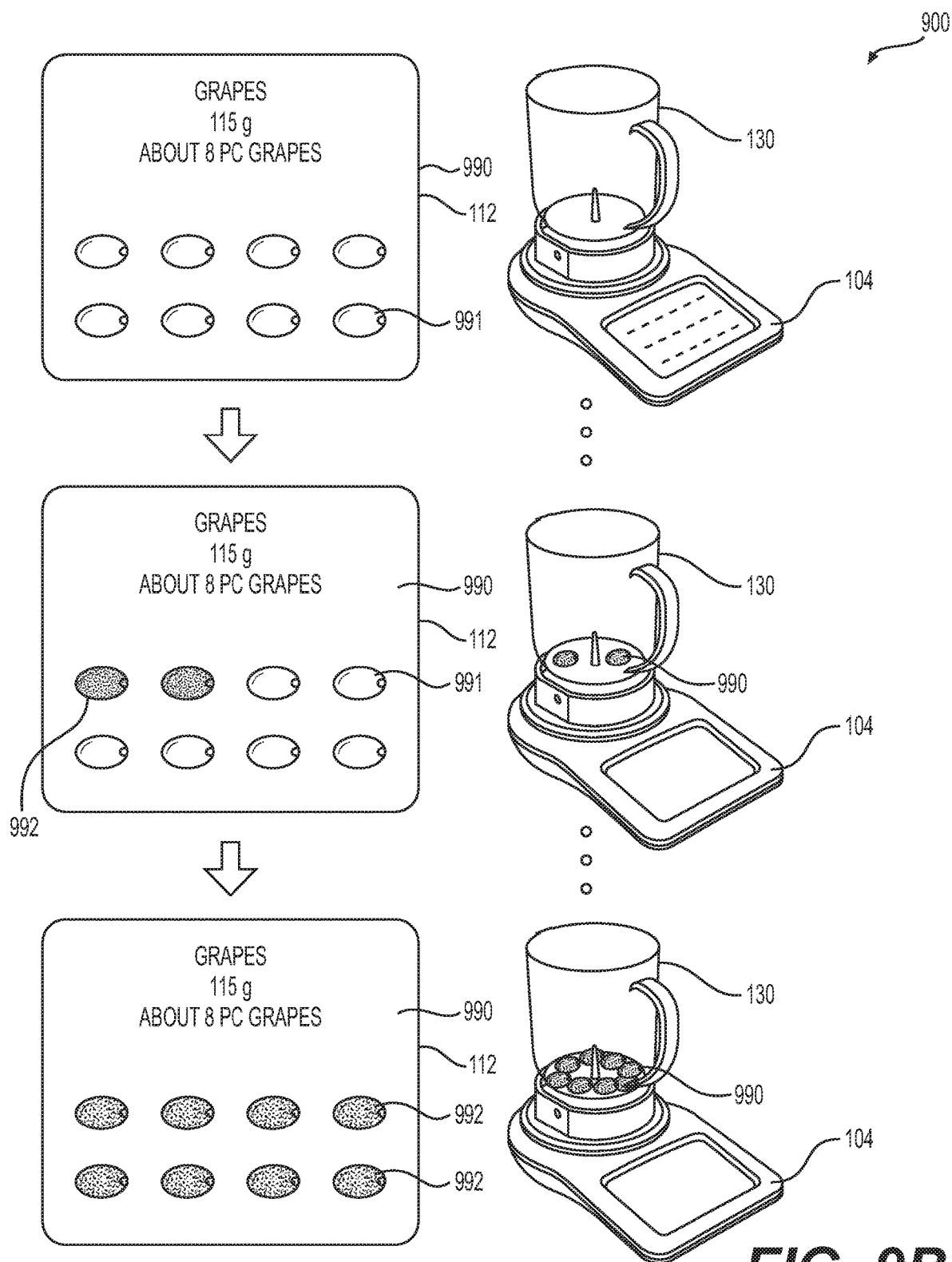
Figure 9C:
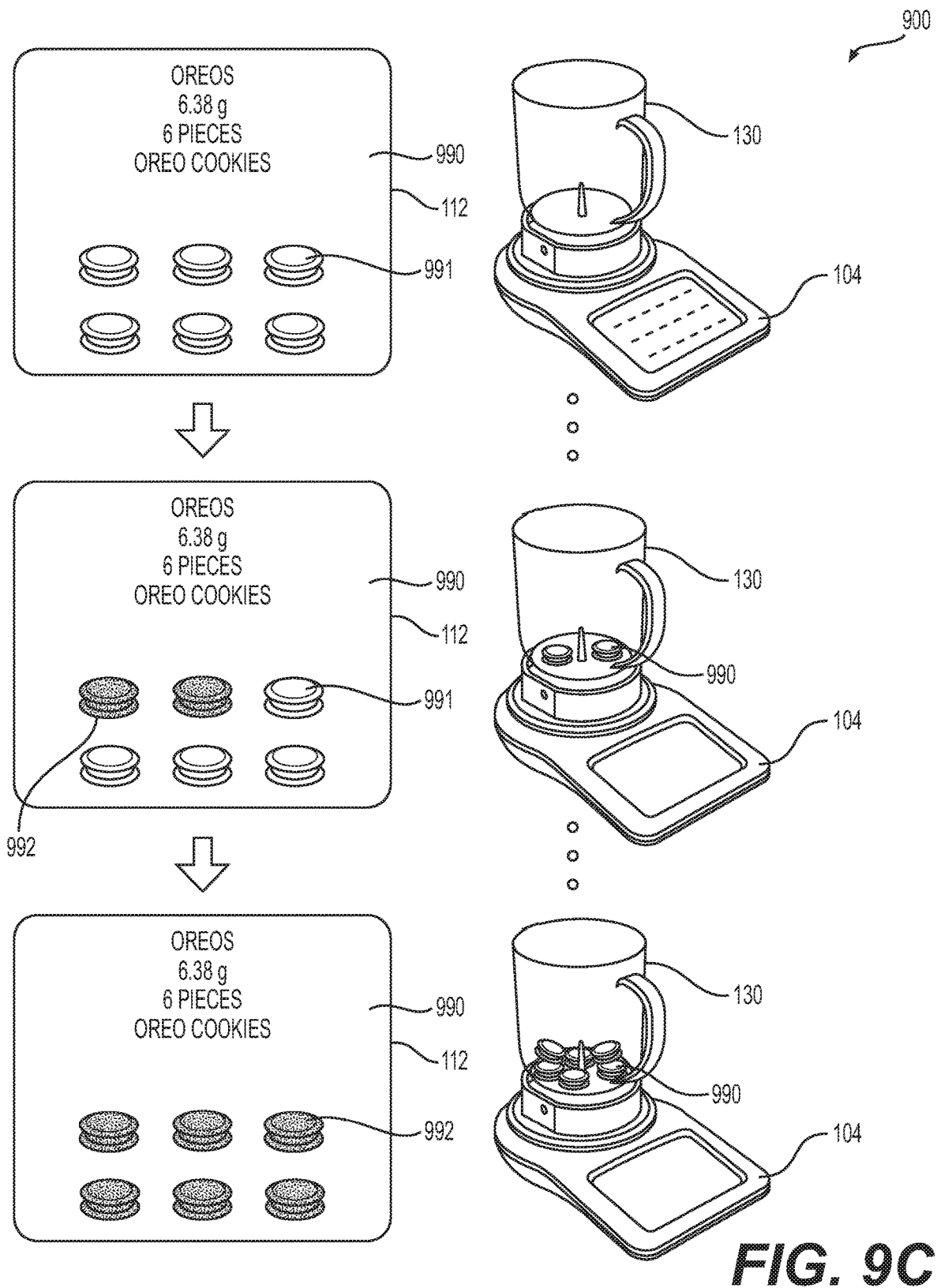
Figure 9D:
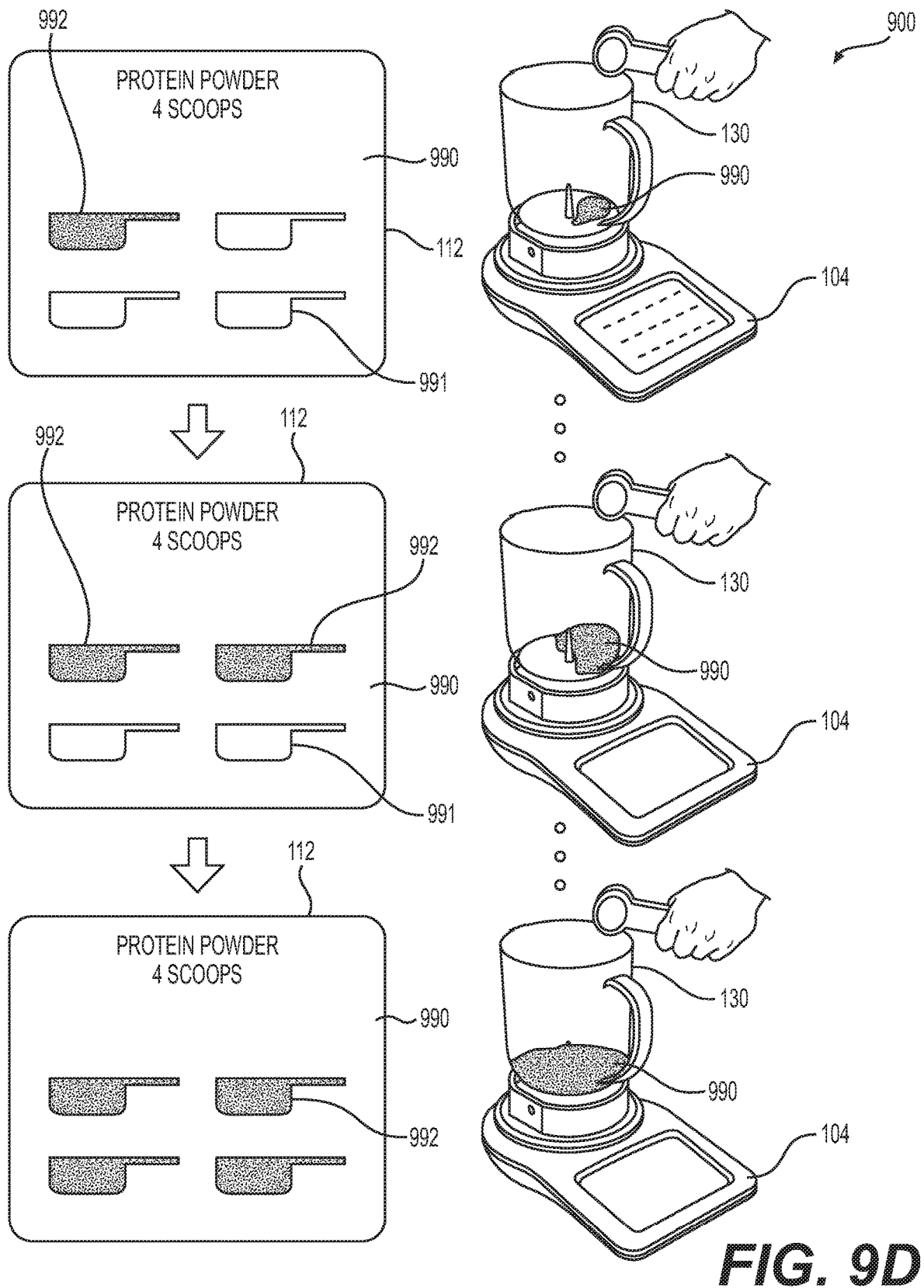

FIG. 9A shows the Illustrated computing environment 900 for a simple ingredient of cinnamon with a number of measurement units of one measurement unit of a cinnamon stick 950 presented in recipe ingredient block 112. The user interface 105 can also provide additional information about the cinnamon stick 950 ingredient and/or other data about the recipe 106 in which the cinnamon stick and used.

FIG. 9B shows the Illustrated computing environment 900 for the simple ingredient of grapes 990 in recipe ingredient block 112 as presented in the FIGS. 6B, 7B and 8C Hint of Mint Smoothie recipe 106. In this example, the grapes 990 simple ingredient is represented as "8 PC" or a number of measurement units of eight, and each measurement unit in a depiction of a grape is shown separately. The measurement units 991 which are not yet completed (for example, the measurement units shown in the first screen) are contrasted with the measurement units 992 shown in the second and third screens as completed. The addition of the grapes 990 also is shown in the container 130 as the grapes are added and thereafter detected by the scale 104. In this manner, the method and systems 100 can support a more precise monitoring of each measurement unit of a simple ingredient as it is added to a container. In addition examples, where there is a variation between the size of grapes 990, the individual measurement unit depictions can reflect differences in sizes and the nutritional panel 110 also can present actual weight measurements of individual measurement units as they are added for greater accuracy on a per measurement unit basis for simple ingredients (not shown). Also, as described above, the total number of measurement units can be adjusted during recipe 106 execution where, for example, the size of the grapes is smaller (or larger) than a threshold amount versus the target weight. In this case, the recipe ingredient block 112 can adjust the representations of 8 measurement units to increase it to 9 (or decrease it to 7), as one example.

FIG. 9C shows the Illustrated computing environment 900 for a simple ingredient of six Oreo® cookies 990, for example, for use in a smoothie or other recipe. The associated recipe ingredient block 112 may signal a number of cookies to be added rather than a specific weight of individual cookies or a collection of six cookies. A user executing this recipe step may add one, two, or more cookies at once. The recipe 106 can include metadata related to any number of characteristics of the recipe 106, including threshold amounts, as discussed above regarding FIGS. 5B and 7A-7C. The metadata for recipe 106 may include an expected mean weight for an Oreo cookie, allowing the smart app 202 to determine based on the measured incremental weight of added Oreo cookie(s), how many individual cookies have been added. This determination can then prompt a display on user interface 105, including in a recipe ingredient block 112 associated with the Oreo cookie simple ingredient, showing individual representations for each Oreo, the number of Oreos currently added and the number of Oreos to be added. Based upon the measured weight of the addition of a discrete ingredient, a smart app 202 may determine that a non-integer number of discrete measurement units have been added. Such a case may be treated as an under pour or over pour condition, and may require correction or adjustment by a user, as discussed above. Similar to FIG. 9B, the Oreos 990 simple ingredient is represented as "6 PIECES" or a number of measurement units of 6 measurement units, and each measurement unit in a depiction of an Oreo, is shown separately. The measurement units 991 which are not yet completed (for example, the measurement units shown in the first screen) are contrasted with the measurement units 992 shown in the second and third screens as completed. The addition of the Oreos 990 also is shown in the container 130 as they are added and thereafter detected by the scale 104. In this example, the more consistent mean weight of Oreos in contrast to fruits for example, affords a greater precision to the measurement of individual measurement units. In other examples, such as based on the use of homemade baked ingredients, the weight of individual measurement units can vary to a greater degree. The processing by the smart app 202 thus may be adapted to present to the user more precision on a per measurement unit basis compared to the use of a more consistent ingredient, such as Oreo cookies. As a result, the methods and systems 100 of the present disclosure can process measurement units of simple ingredients differently depending upon characteristics of the simple ingredients and/or the presentation of the simple ingredient selected in the recipe 106 (or as part of the recipe 106 metadata, or similar) in order to optimize the proportion of the simple ingredient relative to other ingredients in the recipe 106.

FIG. 9D shows the Illustrated computing environment 900 for a simple ingredient of four scoops of protein powder 990 for use in a smoothie or other recipe. The associated recipe ingredient block 112 can signal a predetermined representation of an ingredient in order to convert a weight based ingredient into a simple ingredient. In this manner, the author of a recipe can convert ingredients into simple ingredients by identifying a container for measurement of the ingredient and presenting the ingredient as a number of measurement units of the container for measuring the simple ingredient, in this case, a scoop. The container can be predetermined such as standard measurements of tablespoons, cups, or similar, or can be a container designed for the ingredient or the recipe 106, such as a scoop. In this case, the protein powder 990 is presented with scoops and the depiction can be of the particular scoop to also provide data to the user of the exact shape (and color, not shown) of the scoop in order to support additional guidance to the user executing the recipe 106. Similar to FIG. 9C, the protein powder 990 simple ingredient is represented as "4 SCOOPS" or a number of measurement units of 4 measurement units, and each measurement unit in a depiction of a scoop, is shown separately. The measurement units 991 which are not yet completed (for example, three of the four measurement units shown in the first screen) are contrasted with the measurement units 992 shown in the second (partial) and third (full) screens as completed. The addition of the protein powder 990 using the scoop is shown in the container 130 as they are added and thereafter detected by the scale 104. The user interface 105 also can demonstrate using the scoop to introduce the protein powder into the container 130, such as, for example, any specialized instruction based on the particular ingredient (for example, the consistency of some ingredients can support placing the scoop inside the container 130 or emptying the scoop so that the ingredient covers the base of the container 130 rather than piling ingredients on top of one another to avoid spilling). The FIGS. 9A-9D examples therefore present a variety of examples of simple ingredient representations and the methods and systems 100 of the present disclosure.

CONCLUSION

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system comprising:
   a scale;

a computing device having at least one processor, at least one user interface and a memory; and the memory including computer-executable instructions that, when executed by the at least one processor, cause the at least one processor to:

receive a recipe, the recipe indicating at least two ingredients, at least a first ingredient of the two ingredients being a simple ingredient, the simple ingredient indicating an identification of a discrete simple ingredient measurement unit for measuring the simple ingredient, a number of discrete simple ingredient measurement units required to provide a target simple ingredient weight and a target simple ingredient nutritional data based, at least in part, on the target simple ingredient weight;

receive from the scale, an actual simple ingredient weight measurement of the simple ingredient;

generate an actual simple ingredient nutritional data based, at least in part, on the actual simple ingredient weight measurement; and render, on the user interface, a first indication associated with the simple ingredient, the number of discrete simple ingredient measurement units and one of the target simple ingredient nutritional data or the actual simple ingredient nutritional data.

2. The system of claim 1, wherein the measurement unit is one of a whole or a portion of one of the simple ingredient or a container for measuring the simple ingredient, and the container for measuring the simple ingredient is one of a receptacle, a scoop, a cup, a tablespoon or another measurement utensil.

3. The system of claim 2, wherein the number of discrete simple ingredient measurement units is a representation of one or more of text, alphanumeric characters, graphics, scale, charts, visual indications, audio indications, video indications or other depictions.

4. The system of claim 1, wherein the computer-executable instructions further cause the at least one processor to:

determine that the actual simple ingredient nutritional data is within a threshold amount of the target simple ingredient nutritional data; and upon determining that the actual simple ingredient nutritional data is within the threshold amount of the target simple ingredient nutritional data, render on the user interface, a second indication that the actual simple ingredient nutritional data is within the threshold amount of the target simple ingredient nutritional data.

5. The system of claim 4, wherein the computer-executable instructions further cause the at least one processor to:

determine that the target simple ingredient nutritional data is different than the actual simple ingredient nutritional data; and upon determining that the target simple ingredient nutritional data is different than the actual simple ingredient nutritional data, associate the actual simple ingredient nutritional data with the simple ingredient.

6. The system of claim 1, the recipe further including a total nutritional data for the recipe based, at least in part, on one of the actual simple ingredient nutritional data or the target simple ingredient nutritional data, wherein computer-executable instructions further cause the processor to:

generate the total nutritional data based, at least in part, on one of the actual simple ingredient nutritional data or the target simple ingredient nutritional data; and render, on the user interface, a second indication associated with the total nutritional data.

7. The system of claim 1, wherein the computer-executable instructions further cause the at least one processor to:

determine that the actual simple ingredient nutritional data is not within a threshold amount of the target simple ingredient nutritional data; and upon determining that the actual simple ingredient nutritional data is not within the threshold amount of the target simple ingredient nutritional data, render on the user interface, a second indication that the actual simple ingredient nutritional data is not within the threshold amount of the target simple ingredient nutritional data.

8. The system of claim 7, a second ingredient of the two ingredients indicating a target second ingredient nutritional data, and wherein the computer-executable instructions further cause the at least one processor to:

determine a difference between the target simple ingredient nutritional data and the actual simple ingredient nutritional data; and generate a new target second ingredient nutritional data based, at least in part, on the difference between the target simple ingredient nutritional data and the actual simple ingredient nutritional data, whereby the new target second ingredient nutritional data is scaled to generate a proportional ratio of the second ingredient to the simple ingredient in the recipe.

9. The system of claim 1, the recipe further indicating a second ingredient of the two ingredients is a second simple ingredient, the second simple ingredient indicating an identification of a second discrete simple ingredient measurement unit for measuring the second simple ingredient, a number of second discrete simple ingredient measurement units required to provide a target second simple ingredient weight and a target simple ingredient nutritional data based, at least in part, on the target second simple ingredient weight, and wherein the computer-executable instructions further cause the at least one processor to:

receive from the scale, an actual second simple ingredient weight measurement of the second simple ingredient;

generate an actual second simple ingredient nutritional data based, at least in part, on the actual second simple ingredient weight measurement; and render, on the user interface, a second indication associated with the second simple ingredient, the number of second discrete simple ingredient measurement units and one of the target second simple ingredient nutritional data or the actual second simple ingredient nutritional data.

10. The system of claim 1, wherein the target simple ingredient nutritional data is one of at least one nutrient amount or a combination of one or more of the nutrient amount, and the nutrient amount is a measurement of one of a weight, a volume, a density, a size, a length, a protein, a fat, carbohydrates, calories, dietary fiber, a vitamin, a mineral, a fatty acid, a sugar, or another indication of nutrition.

11. The system of claim 1, wherein the number of simple ingredient discrete measurement units is based, at least in part, on the geographic location of the simple ingredient, the variety of the simple ingredient, the time of year during which the simple ingredient is used, the time from harvesting the simple ingredient until use in the recipe, or a change in weight based on factors related to one of the acquisition, transportation, or use of the simple ingredient.

12. A system comprising:

a scale;

a computing device having at least one processor, at least one user interface and a memory; and the memory including computer-executable instructions that, when executed by the at least one processor, cause the at least one processor to:
- receive a recipe, the recipe indicating at least two ingredients, at least a first ingredient of the two ingredients being a simple ingredient, the simple ingredient indicating an identification of a measurement unit for measuring the simple ingredient, a number of discrete simple ingredient measurement units required to provide a target simple ingredient weight and a target simple ingredient nutritional data based, at least in part, on the target simple ingredient weight;
- render, on the user interface, a first indication associated with the simple ingredient, the measurement unit and the number of discrete simple ingredient measurement units;
- receive from the scale, an actual simple ingredient weight measurement of the simple ingredient;
- determine that the actual simple ingredient weight measurement is within a threshold amount of the target simple ingredient weight divided by the number of discrete simple ingredient measurement units; and
- upon determining that the actual simple ingredient weight measurement is within a threshold amount of the target simple ingredient weight divided by the number of discrete simple ingredient measurement units, render, on the user interface, a second indication associated with a completion of one of the number of discrete measurement units of the simple ingredient.

13. The system of claim 12, the number of measuring units is at least two or more, and wherein the computer-executable instructions further cause the at least one local processor to:
for each one of the number of discrete simple ingredient measurement units:
- determine that the actual simple ingredient weight measurement is within a threshold amount of a result of the target simple ingredient weight divided by the number of discrete simple ingredient measurement units, and further multiplied by the one of the number of discrete simple ingredient measurement units; and
- upon determining that the actual ingredient weight measurement is within the threshold amount of the result, render, on the user interface, a third indication associated with a completion of the one of the number of discrete simple ingredient measurement units.

14. The system of claim 13, the number of measuring units is at least two or more, and wherein the computer-executable instructions further cause the at least one local processor to:
for at least one of the number of discrete simple ingredient measurement units:
- determine that the actual simple ingredient weight measurement is not within the threshold amount of the result;
- upon determining that the actual ingredient weight measurement is not within the threshold amount of the result, generate a new number of discrete simple ingredient measurement units;
- render, on the user interface, a fourth indication associated with the new number of discrete measurement units.

15. The system of claim 12, wherein the measurement unit is one of a whole or a portion of one of the simple ingredient or a container for measuring the simple ingredient, and the container for measuring the simple ingredient is one of a receptacle, a scoop, a cup, a tablespoon or another measurement utensil.

16. The system of claim 15, wherein the number of discrete simple ingredient measurement units is a representation of one or more of text, alphanumeric characters, graphics, scale, charts, visual indications, audio indications, video indications or other depictions.

17. The system of claim 12, wherein the target simple ingredient nutritional data is one of at least one nutrient amount or a combination of one or more of the nutrient amount, and the nutrient amount is a measurement of one of a weight, a volume, a density, a size, a length, a protein, a fat, carbohydrates, calories, dietary fiber, a vitamin, a mineral, a fatty acid, a sugar, or another indication of nutrition.

18. The system of claim 12, wherein the number of discrete simple ingredient measurement units is based, at least in part, on the geographic location of the simple ingredient, the variety of the simple ingredient, the time of year during which the simple ingredient is used, the time from harvesting the simple ingredient until use in the recipe, or a change in weight based on factors related to one of the acquisition, transportation, or use of the simple ingredient.

19. A method comprising:
- receiving a recipe, the recipe indicating at least two ingredients, at least a first ingredient of the two ingredients being a simple ingredient, the simple ingredient indicating an identification of a measurement unit for measuring the simple ingredient, a number of discrete simple ingredient measurement units required to provide a target simple ingredient weight and a target simple ingredient nutritional data based, at least in part, on the target simple ingredient weight;
- receiving from the scale, an actual simple ingredient weight measurement of the simple ingredient;
- generating an actual simple ingredient nutritional data based, at least in part, on the actual simple ingredient weight measurement; and
- rendering, on the user interface, a first indication associated with the simple ingredient, the number of discrete simple ingredient measurement units and one of the target simple ingredient nutritional data or the actual simple ingredient nutritional data.

20. The method of claim 19, further comprising:
- determining that the actual simple ingredient nutritional data is within a threshold amount of the target simple ingredient nutritional data; and
- upon determining that the actual simple ingredient nutritional data is within the threshold amount of the target simple ingredient nutritional data, rendering on the user interface, a second indication that the actual simple ingredient nutritional data is within the threshold amount of the target simple ingredient nutritional data.

* * * * *